United States Patent
Ovshinsky et al.

(10) Patent No.: US 6,926,986 B2
(45) Date of Patent: *Aug. 9, 2005

(54) FUEL CELL WITH ENCAPSULATED ELECTRODES

(75) Inventors: Stanford R. Ovshinsky, Bloomfield Hills, MI (US); Ana Menjak, Troy, MI (US); Thomas Hopper, Clawson, MI (US); Zdravko Menjak, Troy, MI (US); Kevin Fok, Troy, MI (US); Boyko Aladjov, Rochester Hills, MI (US); Srinivasan Venkatesan, Southfield, MI (US); Subhash K. Dhar, Bloomfield, MI (US)

(73) Assignee: Energy Conversion Devices, Rochester Hills, MI (US)

( * ) Notice: Subject to any disclaimer, the term of this patent is extended or adjusted under 35 U.S.C. 154(b) by 489 days.

This patent is subject to a terminal disclaimer.

(21) Appl. No.: 10/143,701

(22) Filed: May 9, 2002

(65) Prior Publication Data

US 2005/0042495 A1 Feb. 24, 2005

Related U.S. Application Data

(63) Continuation-in-part of application No. 10/134,756, filed on Apr. 29, 2002.

(51) Int. Cl.[7] .................................................. H01M 8/02
(52) U.S. Cl. ............................ 429/34; 429/37; 429/44
(58) Field of Search ................................ 429/34, 37, 44

(56) References Cited

U.S. PATENT DOCUMENTS

| | | | |
|---|---|---|---|
| 3,597,275 A | | 8/1971 | Winsel et al. |
| 4,294,893 A | * | 10/1981 | Iemmi et al. ................ 429/42 |
| 4,623,597 A | | 11/1986 | Sapru et al. |
| 5,482,792 A | * | 1/1996 | Faita et al. ................... 429/30 |
| 6,022,634 A | * | 2/2000 | Ramunni et al. ............. 429/34 |

FOREIGN PATENT DOCUMENTS

EP 620609 A1 * 10/1994 ............ H01M/8/24

OTHER PUBLICATIONS

Blomen et al., "Fuel Cell Systems", Plenum Press, 1993, pp. 245–250.*

* cited by examiner

*Primary Examiner*—Gregg Cantelmo
(74) *Attorney, Agent, or Firm*—Frederick W. Mau, II; Marvin S. Siskind

(57) ABSTRACT

A fuel cell utilizing parallel flow of a hydrogen stream, an oxygen stream, and an electrolyte solution with respect to the electrodes, while maintaining mechanical support within the fuel cell. The fuel cell utilizes encapsulated electrodes to maintain a high air flow rate and low pressure throughout the fuel cell. The fuel cell is also designed to maintain mechanical support within the fuel cell while the electrodes expand and contract in response to the absorption of oxygen and hydrogen. Gas is predistributed by the compression plates and electrode plates to supply the electrodes with high concentrations of oxygen from air.

54 Claims, 22 Drawing Sheets

Detail B

Figure 2
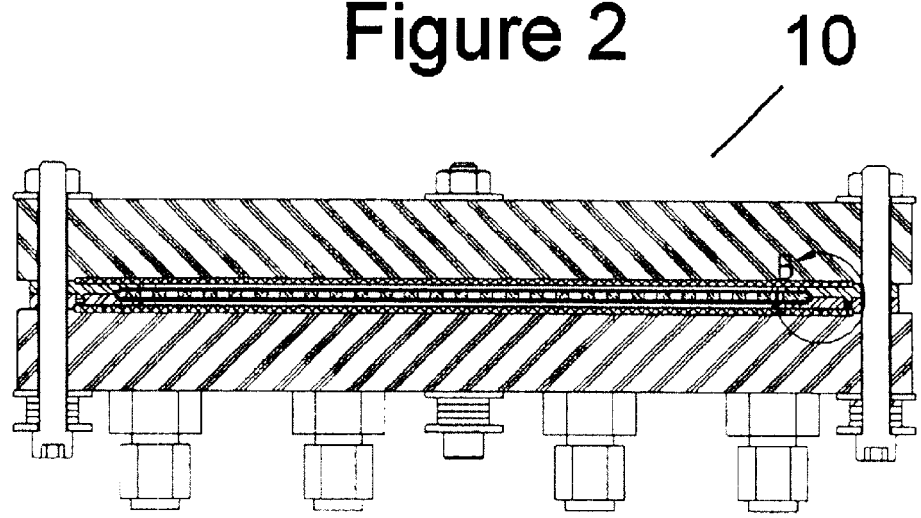
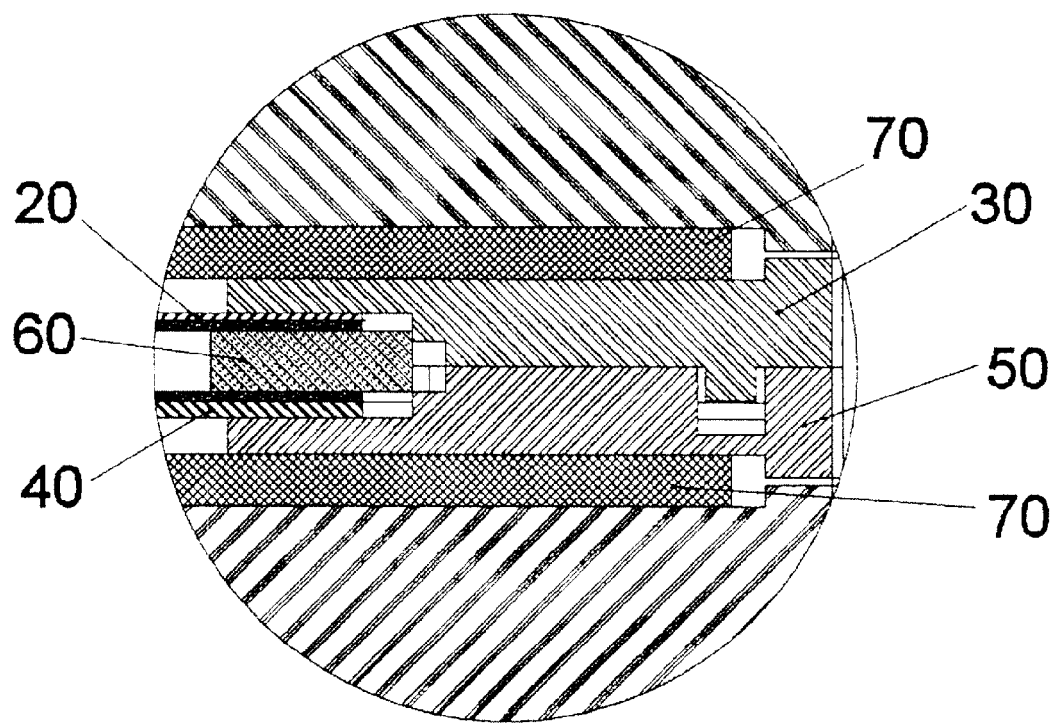
Detail B
Figure 3

FUEL CELL WITH ENCAPSULATED ELECTRODES

REFERENCE TO RELATED APPLICATIONS

The present invention is a continuation-in-part, and is entitled to the benefit to the earlier filing date and priority of, co-pending U.S. patent application Ser. No. 10/134,756, which is assigned to the same assignee as the current application, entitled "Fuel Cell With Framed Electrodes", filed Apr. 29, 2002, the disclosure of which is hereby incorporated by reference.

FIELD OF THE INVENTION

The present invention generally relates to fuel cells. More particularly, the present invention relates to alkaline fuel cells wherein the electrodes are encapsulated to allow high air flow throughout the fuel cell while maintaining a low pressure within the fuel cell.

BACKGROUND OF THE INVENTION

Fuel cells use gaseous hydrogen streams, gaseous oxygen streams, and electrolyte streams to produce power. The oxygen stream may be pure oxygen, air, or another oxygen containing mixture. Air, however, is the most abundant and attainable source of oxygen. Due to air containing only 21% oxygen, a greater air flow rate is needed when air is used as a source of oxygen, as compared to a pure oxygen stream. As a result of the high flow rate of the oxygen stream, the pressure inside the fuel cell increases. The pressure increases inside fuel cells may cause design problems for other streams entering and exiting the fuel cell because the pressure of the streams will need to be adjusted according to the pressure within the fuel cell. As such, a fuel cell allowing for a high air flow rate while maintaining a low pressure within the fuel cell is very desirable.

The present invention utilizes parallel flow of an electrolyte solution with respect to the electrodes. The electrodes are encapsulated between specially designed electrode plates which distribute electrolyte solution and either air or hydrogen across the electrodes. This design allows the oxygen stream or the hydrogen stream to forcibly reach the electrodes. The electrode plates encapsulating the electrodes are sealed together and flow channels in the electrode plates distribute air, hydrogen, and electrolyte solution across the electrodes while maintaining low pressure throughout the fuel cell. The present invention provides a compacted fuel cell design while allowing for a high air flow while maintaining a low pressure throughout the fuel cell.

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention is another product which is essential to shortening that period to a matter of years. In the near term, hydrogen will be used in fuel cells for cars, trucks and industrial plants, just as it already provides power for orbiting spacecraft. But, with the problems of storage and infrastructure solved (see U.S. Pat. No. 6,305,442, entitled "A Hydrogen-based Ecosystem" filed on Nov. 22, 1999 for Ovshinsky, et al., which is herein incorporated by reference and U.S. Pat. No. 6,193,929, entitled "High Storage Capacity Alloys Enabling a Hydrogen-based Ecosystem", filed on Nov. 6, 1999 for Ovshinsky et al., which is herein incorporated by reference), hydrogen will also provide a general carbon-free fuel to cover all fuel needs.

A dramatic shift has now occurred, in which the problems of global warming and climate change are now acknowledged and efforts are being made to solve them. Therefore, it is very encouraging that some of the world's biggest petroleum companies now state that they want to help solve these problems. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered to be "THE" fuel for the future. Hydrogen is the most plentiful element in the universe (over 95%). Hydrogen can provide an inexhaustible, clean source of energy for our planet which can be produced by various processes. Utilizing the inventions of subject assignee, the hydrogen can be stored and transported in solid state form in trucks, trains, boats, barges, etc. (see the '810 and '497 applications).

A fuel cell is an energy-conversion device that directly converts the energy of a supplied gas into an electric energy. Researchers have been actively studying fuel cells to utilize the fuel cell's potential high energy-generation efficiency. The base unit of the fuel cell is a cell having an oxygen electrode, a hydrogen electrode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells. Presently most of the fuel cell R & D focus is on P.E.M. (Proton Exchange Membrane) fuel cells. The P.E.M. fuel cell suffers from relatively low conversion efficiency and has many other disadvantages. For instance, the electrolyte for the system is acidic. Thus, noble metal catalysts are the only useful active materials for the electrodes of the system. Unfortunately, not only are the noble metals costly, they are also susceptible to poisoning by many gases, and specifically carbon monoxide (CO). Also, because of the acidic nature of the P.E.M. fuel cell, the remainder of the materials of construction of the fuel cell need to be compatible with such an environment, which again adds to the cost thereof. The proton exchange membrane itself is quite expensive, and because of its low conductivity, inherently limits the power performance and operational temperature range of the P.E.M. fuel cell (the P.E.M. is nearly non-functional at low temperatures, unlike the fuel cell of the instant invention). Also, the membrane is sensitive to high temperatures, and begins to soften at 120° C. The membrane's conductivity depends on water and dries out locally at higher temperatures, resulting in cell failure. Therefore, there are many disadvantages to the P.E.M. fuel cell which make it somewhat undesirable for commercial/consumer use.

The conventional alkaline fuel cell has some advantages over P.E.M. fuel cells in that they have higher operating efficiencies, they use less expensive materials of construction, and they have no need for expensive membranes. The alkaline fuel cell also has relatively higher ionic conductivity in the electrolyte, therefore it has a much higher power capability. Unfortunately, conventional alkaline fuel cells still suffer from certain disadvantages. For instance, conventional alkaline fuel cells still use expensive noble metals catalysts in both electrodes, which, as in the P.E.M. fuel cell, are susceptible to gaseous contaminant poisoning. While the conventional alkaline fuel cell is less sensitive to temperature than the P.E.M. fuel cell, the active materials of conventional alkaline fuel cell electrodes become very inefficient at low temperatures.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation a especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolytic solution. The particular materials utilized for the hydrogen electrode and oxygen electrode are important since they must act as efficient catalysts for the reactions taking place.

In an alkaline fuel cell, the reaction at the hydrogen electrode occurs between the hydrogen fuel and hydroxyl ions (OH⁻) present in the electrolyte, which react to form water and release electrons:

$$H_2+2OH^-\rightarrow 2H_2O+2e^-.$$

At the oxygen electrode, the oxygen, water, and electrons react in the presence of the oxygen electrode catalyst to reduce the oxygen and form hydroxyl ions (OH⁻):

$$O_2+2H_2O+4e^-\rightarrow 4OH^-.$$

The flow of electrons is utilized to provide electrical energy for a load externally connected to the hydrogen and oxygen electrodes.

The catalyst in the hydrogen electrode of the alkaline fuel cell has to not only split molecular hydrogen to atomic hydrogen, but also oxidize the atomic hydrogen to release electrons. The overall reaction can be seen as (where M is the catalyst):

$$M+H_2\rightarrow 2MH\rightarrow M+2H^++2e^-.$$

Thus the hydrogen electrode catalyst must efficiently dissociate molecular hydrogen into atomic hydrogen. Using conventional hydrogen electrode material, the dissociated hydrogen atoms are transitional and the hydrogen atoms can easily recombine to form molecular hydrogen if they are not used very quickly in the oxidation reaction. With the hydrogen storage electrode materials of the inventive instant startup fuel cells, the atomic hydrogen is immediately captured and stored in hydride form, and then used as needed to provide power.

In addition to being catalytically efficient on both interfaces, the catalytic material must be resistant to corrosion in the alkaline electrolyte environment. Without such corrosion resistance, the electrodes would quickly lose efficiency and the cell will die.

One prior art fuel cell hydrogen electrode catalyst is platinum. Platinum, despite its good catalytic properties, is not very suitable for wide scale commercial use as a catalyst for fuel if cell hydrogen electrodes, because of its very high cost. Also, noble metal catalysts like platinum cannot withstand contamination by Impurities normally contained in the hydrogen fuel stream. These impurities can include carbon monoxide which may be present in hydrogen fuel.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the hydrogen electrode. The catalytic sites of the hydrogen electrode therefore are reduced since the overall number of available catalytically active sites is significantly lowered by poisoning. In addition, the decrease in catalytic activity results in increased over-voltage at the hydrogen electrode and hence the cell is much less efficient adding significantly to the operating costs. Over-voltage is the difference between the actual working electrode potential and it's equilibrium value, the physical meaning of over-voltage is the voltage required to overcome the resistance to the passage of current at the surface of the hydrogen electrode (charge transfer resistance). The over-voltage represents an undesirable energy loss which adds to the operating costs of the fuel cell.

In related work, U.S. Pat. No. 4,623,597 ("the '597 patent") and others in it's lineage, the disclosure of which is hereby incorporated by reference, one of the present inventors, Stanford R. Ovshinsky, described disordered multi-component hydrogen storage materials for use as negative electrodes in electrochemical cells for the first time. In this patent, Ovshinsky describes how disordered materials can be tailor made (i.e., atomically engineered) to greatly increase hydrogen storage and reversibility characteristics. Such disordered materials are amorphous, microcrystalline, intermediate range order, and/or polycrystalline (lacking long range compositional order) wherein the polycrystalline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the hydrogen electrodes of the '597 patent were accomplished by manipulating the local chemical order and hence the local structural order by the incorporation of selected modifier elements into a host matrix to create a desired disordered material. Disorder permits degrees of freedom, both of type and of number, within a material, which are unavailable in conventional materials. These degrees of freedom dramatically change a materials physical, structural, chemical and electronic environment. The disordered material of the '597 patent have desired electronic configurations which result in a large number of active sites. The nature and number of storage sites were designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods there between resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of electro-catalytically active sites and hydrogen storage sites.

The disordered materials ok the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

Disorder can be of an atomic nature in the form of compositional or configurational disorder provided throughout the bulk of the material or in numerous regions of the material. The disorder also can be introduced by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve improved and unique results, using the Ovshinsky principles of disorder on an atomic or microscopic scale.

SUMMARY OF THE INVENTION

The present invention discloses an improved fuel cell. The fuel cell of the present invention allows for a high oxygen stream flow rate (which is essential when using air is used as the source of oxygen) while maintaining low pressure throughout the fuel cell. The cell design also provides mechanical support within the fuel cell. The fuel cell contains at least one hydrogen electrode in contact with a hydrogen stream, at least one oxygen electrode in contact with an oxygen stream, and at least one electrolyte chamber in contact with the hydrogen electrode and the oxygen electrode. The hydrogen stream may be composed of gaseous hydrogen and the oxygen stream may be composed of pure oxygen or air from the environment. An electrolyte solution, such as potassium hydroxide, flows through the electrolyte chambers and contacts the hydrogen electrodes and the oxygen electrode. The fuel cell also contains multiple rubber compression plate used to direct oxygen and hydrogen to the electrodes and help maintain mechanical support in the fuel cell while allowing for expansion and contraction of the electrodes.

The hydrogen and the oxygen electrodes are encapsulated in specially designed electrode plates. The electrolyte chamber is placed between the hydrogen electrode and the oxygen electrode and the electrode plates are adhered together forming an electrode chamber. The electrode plates are configured to uniformly distribute the electrolyte solution between the electrodes. The electrode plates also uniformly distribute hydrogen and oxygen to the respective electrodes. Hydrogen or oxygen flows through holes in the outer face of the electrode plates and is evenly distributed across the respective electrodes by a plurality of flow channels on the inner face of the electrode plate. The holes in the outer face of the electrode may have different sizes to optimize the flow of hydrogen or oxygen across the respective electrodes. Preferably the hydrogen and oxygen stream flow vertically across the electrode which is the shortest path for the hydrogen and oxygen stream.

Alternatively, the hydrogen and oxygen stream may flow laterally across the electrodes which is the longer path for the hydrogen and oxygen stream.

Compression plates are placed outside the frames within the fuel cell. The compression plates have a large opening which directs the hydrogen and oxygen to the holes in the electrode plates. The compression plates are also adapted to absorb expansion of the electrodes while providing mechanical support within the fuel cell. The compression plate may be comprised of rubber or another elastomeric compound capable of absorbing the expansion of the electrodes.

The electrolyte chambers may be composed of a porous support structure disposed between a pair of membranes. The membranes prevent excess electrolyte solution from contacting the hydrogen electrodes and the oxygen electrode. The membranes also prevent the oxygen stream and the hydrogen stream from penetrating into the electrolyte. The porous support structure may be an expanded polymer sheet. The polymer may be of polyolefin or another rigid polymer. The electrolyte chambers contact an electrolyte contacting surface of the hydrogen electrodes and the oxygen electrodes. The electrolyte chamber is adapted to provide mechanical support within the fuel cell and provide a pathway for uninterrupted flow of the electrolyte solution throughout the fuel cell. The electrolyte chambers allow the electrolyte solution to contact the hydrogen electrodes and the oxygen electrodes.

The hydrogen electrode may be composed of an anode active material having hydrogen storage capacity. The hydrogen electrode has a hydrogen contacting surface, an electrolyte solution contacting surface, and a bulk of an active anode material. The bulk of said anode active material is disposed between the hydrogen contacting surface and the electrolyte contacting surface. The hydrogen contacting surface is adapted to dissociate and absorb gaseous hydrogen. The bulk of said anode active material is adapted to store said absorbed hydrogen. The electrolyte contacting surface is adapted to react said stored hydrogen with an electrolyte solution.

The hydrogen electrode may comprise an anode active material layer, a porous polytetrafluoroethylene (PTFE) layer, and a current collector grid. The anode active material layer may be composed of a mixture of $AB_5$ type of alloy, $AB_2$ type of alloy, Raney nickel, graphite, and PTFE powder. The anode active material layer is disposed between the current collector grid and the polytetrafluoroethylene layer. The anode active material layer may be dispersed throughout the current collector grid. Examples of current collector grids include, but are not limited to, mesh, grid, matte, expanded metal, foil, foam and plate. To reduce the ohmic drop and better distribute current, the mesh may have 40 wires per inch running horizontally and 20 wires per inch running vertically. The current collector grid may be composed of a conductive metal such as nickel.

The oxygen electrode has an oxygen contacting surface, an electrolyte solution contacting surface, and a bulk of a cathode active material. The bulk of the cathode active material is disposed between the oxygen contacting surface and the electrolyte contacting surface. The oxygen contacting surface is adapted to dissociate and absorb gaseous oxygen. The bulk of said cathode active material is adapted to store the absorbed oxygen. The electrolyte contacting surface is adapted to react the stored oxygen with an electrolyte solution.

The oxygen electrode is composed of a gas diffusion layer, a catalyst layer, a polytetrafluoroethylene layer, and a current collector grid. The catalyst layer is disposed between the gas diffusion layer and the current collector grid. The gas diffusion layer is disposed between the catalyst layer and the polytetrafluoroethylene layer. The polytetrafluoroethylene layer is in intimate contact with the oxygen stream. The current collector grid is in intimate contact with said electrolyte stream. The current collector grid may be a mesh, grid, matte, expanded metal, foil, foam and plate. To reduce the ohmic drop and better distribute current, the mesh may have 40 wires per inch running horizontally and 20 wires per inch running vertically. The current collector may be composed of a conductive material such as nickel. The catalyst layer may be dispersed throughout the current collector grid. The gas diffusion layer may be composed of a mixture of polytetrafluoroethylene and carbon black. The catalyst layer may be composed of a mixture of a mixture of polytetrafluoroethylene and carbon black, additional carbon black, graphite, silver oxide, or other catalysts. The silver oxide may contain a lithium aluminum alloy, gallium, molybdenum, or nickel.

BRIEF DESCRIPTION OF THE DRAWINGS

FIG. 2, shows a side view of the fuel cell of the present invention.

FIG. 3, shows a magnified cross sectional view of the fuel cell of the present invention as shown in FIG. 2.

DETAILED DESCRIPTION OF THE INVENTION

In the past, fuel cells have been designed to use air as a source of oxygen. When air is used as an oxygen source, the air flow rate must be approximately 5 times the required flow rate of pure oxygen, due to air containing 21% oxygen. The high air flow rate can substantially raise the pressure within the fuel cell thereby creating design problems. The present invention allows for a high air flow rate while maintaining a low pressure throughout the fuel cell. This invention applies parallel flow of a hydrogen stream, an oxygen stream, and an electrolyte stream throughout a fuel cell with respect to framed electrodes. The components of the fuel cell are compacted tightly together to provide mechanical support throughout the fuel cell while allowing for electrode expansion. While the fuel cell may be compacted together, the fuel cell allows uninterrupted flow of hydrogen, oxygen, and an electrolyte solution across the electrodes. Gases and liquids flow through the cell via flow channels and porous structures. The design of the present invention allows for high speed gas flow throughout the fuel cell while maintaining a low pressure throughout the cell. The fuel cell also allows for expansion of the electrodes by using layers designed to absorb the expansion of the electrodes in the Z direction as the electrodes absorb hydrogen.

Figure 1:
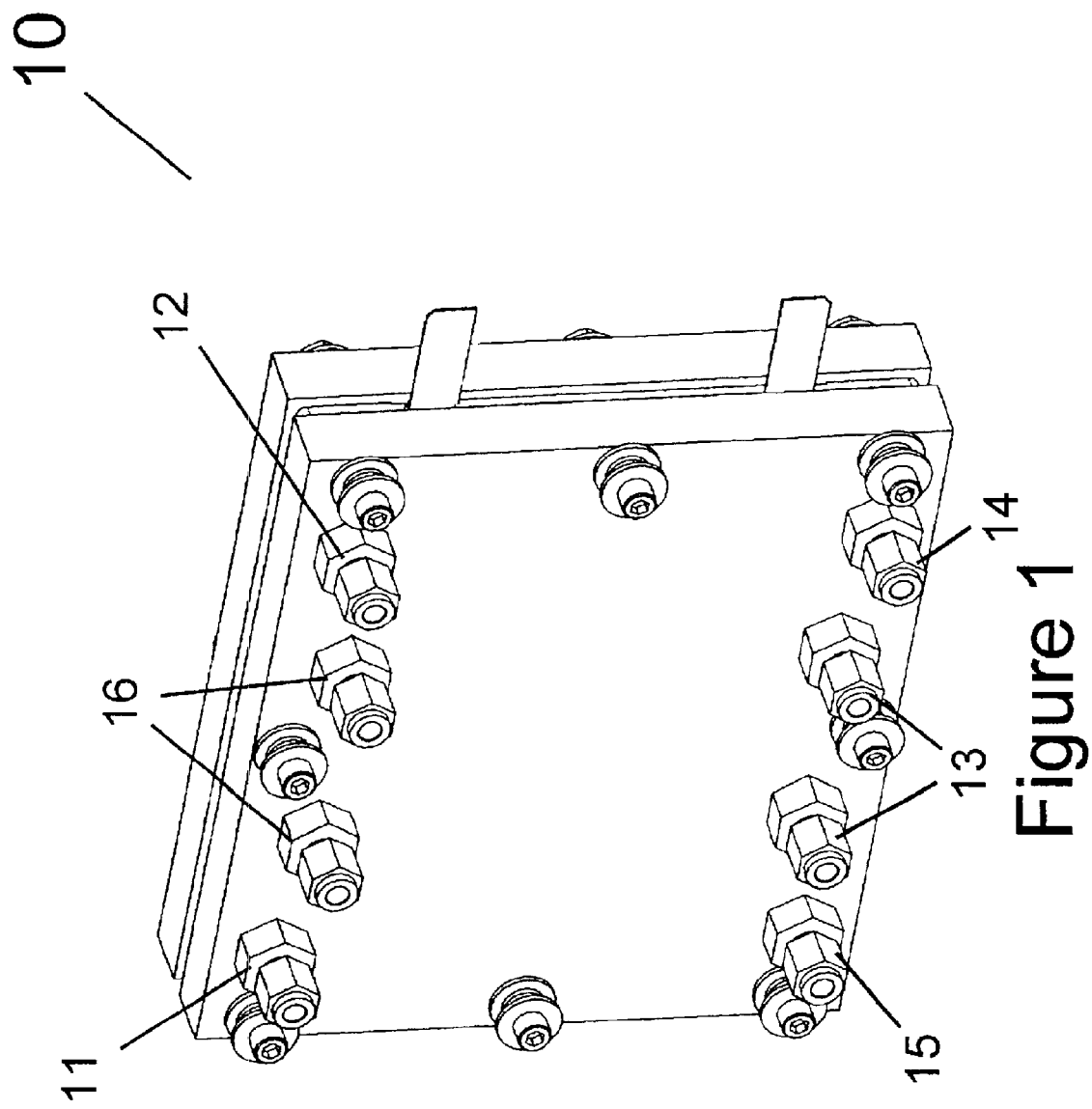
FIG. 1, shows the fuel cell of the present invention.

The fuel cell 10 of the present invention is shown in FIG. 1. The layers of the fuel cell have multiple holes through which oxygen, hydrogen, and electrolyte solution flow. When the layers are stacked and pressed together, the holes of each layer line up to allow uninterrupted flow throughout the cell. The fuel cell has a hydrogen inlet 11, an oxygen inlet 12, two electrolyte inlets 13, a hydrogen outlet 14, a oxygen outlet 15, and two electrolyte outlets 16. The hydrogen flows into the fuel cell through the hydrogen inlet 11 to the hydrogen electrode. The hydrogen is distributed across the hydrogen contacting side of the hydrogen electrode and is absorbed by the hydrogen electrode with the excess hydrogen flowing out of the fuel cell through the hydrogen outlet 14. The excess hydrogen may be used to help remove heat generated by the absorption of hydrogen from the fuel cell. Oxygen or an oxygen containing mixture, such as air, flows into the fuel cell through the oxygen inlet 12 to the oxygen electrode. The oxygen stream is distributed across the oxygen contacting side of the oxygen electrode and is absorbed by the oxygen electrode. The remaining oxygen stream containing unconsumed oxygen and nitrogen then flows out of the fuel cell through the oxygen outlet 15. An oxygen outlet 15 may not be needed when a pure oxygen stream is used as the oxygen source, where the system is configured to consume all oxygen input into the fuel cell. When air is used as the oxygen source, the air flows across the oxygen electrode and the oxygen is absorbed from the air. The remaining nitrogen and carbon dioxide left from the air stream flow out of the fuel cell through the oxygen outlet. The remaining air stream may also help remove heat from the fuel cell. The electrolyte solution flows into the fuel cell through the electrolyte inlets to the electrolyte chamber.

The electrolyte solution is distributed through the electrolyte chamber and contacts the hydrogen and oxygen electrodes. The electrolyte solution preferably flows across the shorter side of the electrodes. After the electrolyte solution flows past the electrodes, the electrolyte solution then flows out of the fuel cell through the electrolyte outlets 16. The exiting electrolyte solution may also help remove heat from the fuel cell.

Figure 4:
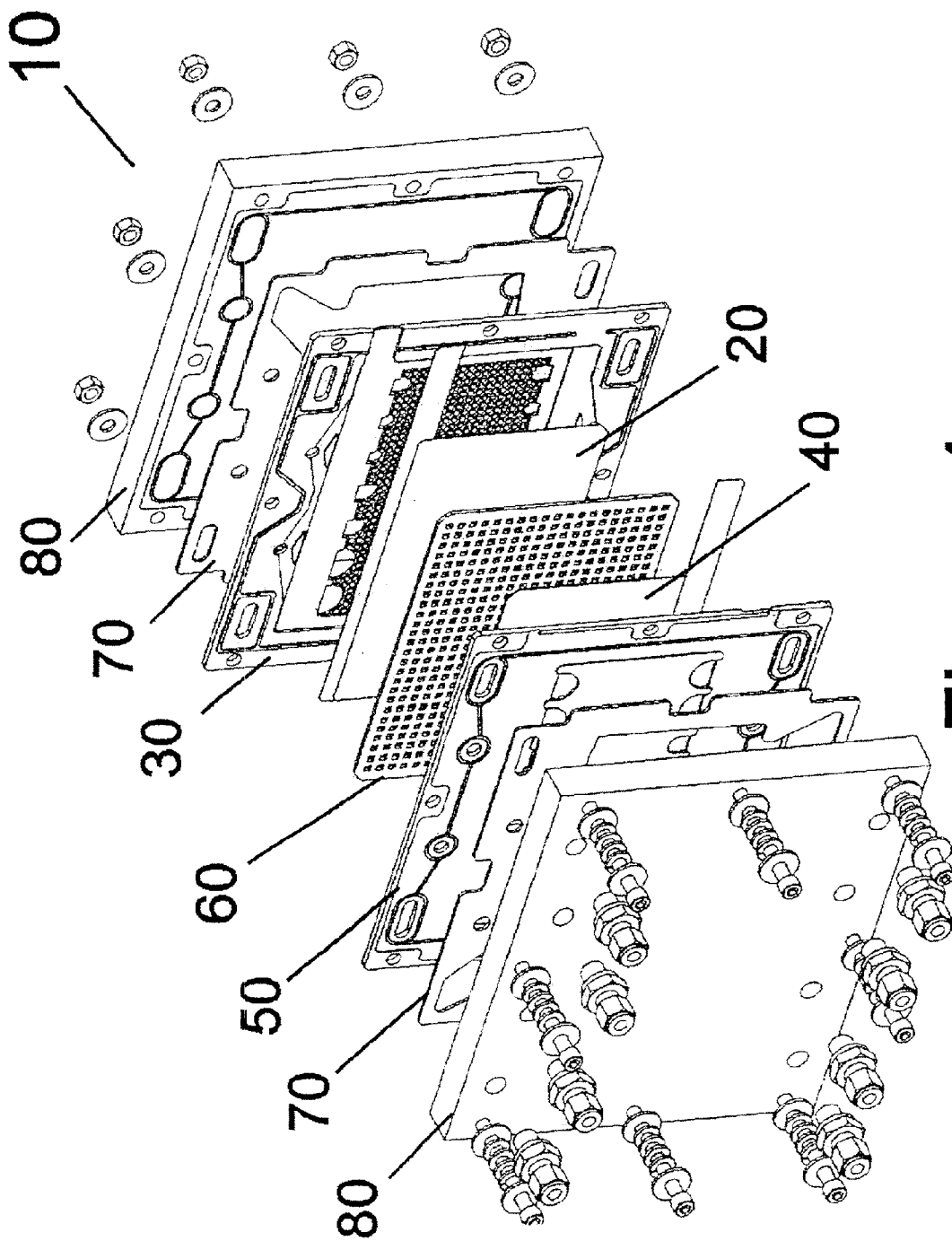
FIG. 4, shows an exploded view of the fuel cell of the present invention.

A side view of the fuel cell is shown in FIG. 2. A cross-sectional view of the fuel cell of FIG. 2 is shown in FIG. 3 and an exploded view of the fuel cell of FIG. 2 is shown in FIG. 4. The fuel cell has a stack formation with multiple layers. The fuel cell contains at least one hydrogen electrode 20 and at least one oxygen electrode 40. The hydrogen electrode 20 and oxygen electrode 40 are each disposed in electrode plates. An electrolyte chamber 60 is placed in between the hydrogen electrode 20 and the oxygen electrode 40. The hydrogen electrode plate 30 and the oxygen electrode plate 50 are adhered together to form an electrode chamber containing the hydrogen electrode 20, the oxygen electrode 40, and the electrolyte chamber 60. The hydrogen electrode plate 30 and the oxygen electrode plate 50 can be adhered together using epoxy, plastic welding, or other modes of hermetic sealing. Rubber compression plates 70 are placed outside the hydrogen electrode plate 30 and the oxygen electrode plate 50, and electrode end plates 80 are placed outside the rubber compression plates 70 to complete the stack. The electrode end plates 80 are bolted together and provide mechanical support and compression to the fuel cell.

The fuel cell is easily expandable by addition of electrode chambers as dictated by design requirements. In such case additional hydrogen electrodes, oxygen electrodes, and electrolyte chambers, electrode plates, and compression plates may be added. The layers may be positioned as earlier described with two hydrogen electrodes sharing the hydrogen stream and two oxygen electrodes sharing the oxygen stream.

Figure 5:
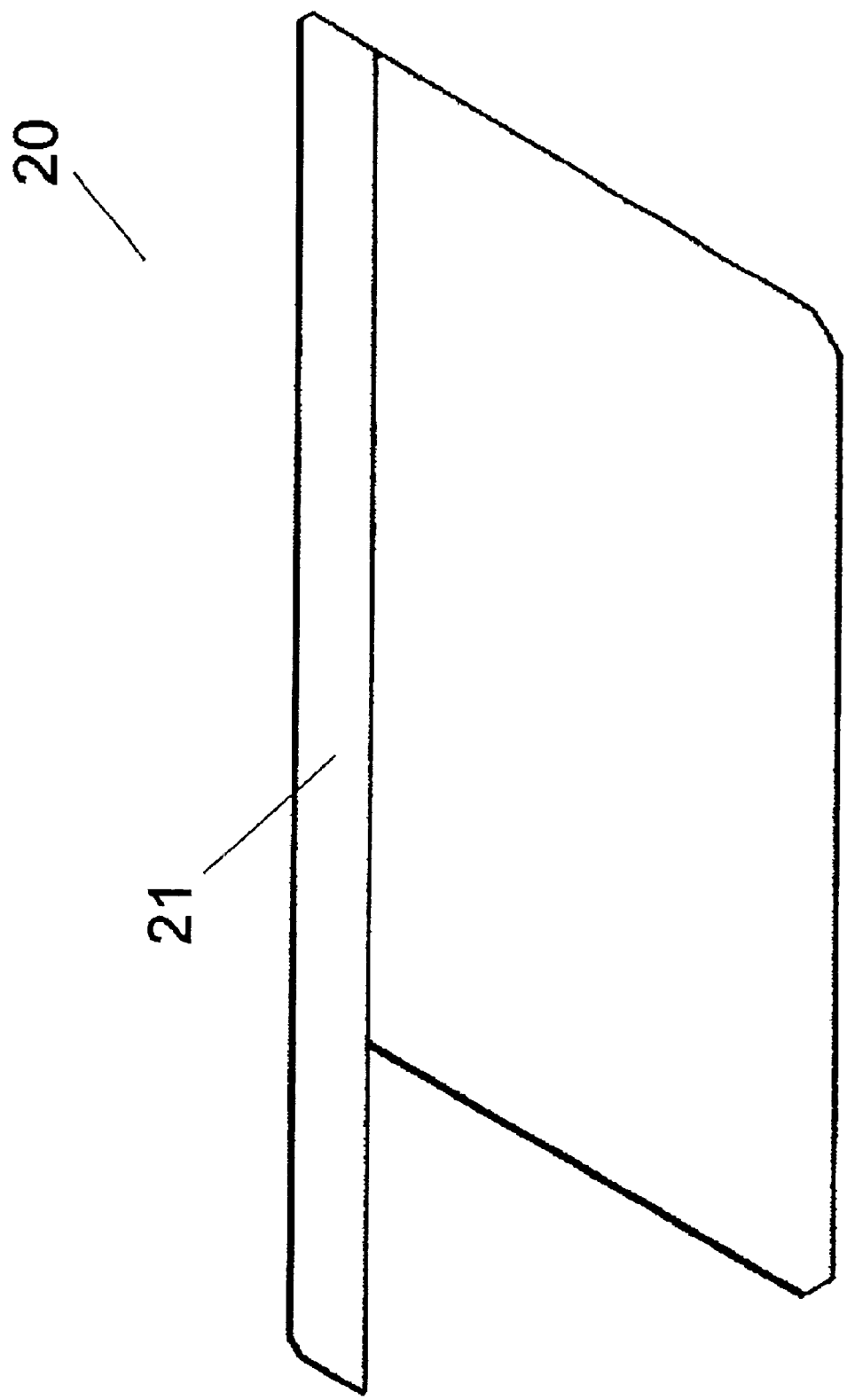
FIG. 5, shows a detailed view of a hydrogen electrode in accordance with the present invention.

Each fuel cell contains at least one hydrogen electrode 20. A more detailed view of an hydrogen electrode in accordance with the present invention is shown in FIG. 5. The hydrogen electrode is substantially rectangular in shape. An aspect ratio of 1 to 1 for the hydrogen electrode is preferred to better accommodate electrode expansion, current distribution, and current collection, however, other aspect ratios may be used in accordance with the present invention. The hydrogen electrode may be composed of a hydrogen storage alloy. The hydrogen electrode is flat with a current collector 21 running along one of the longer sides of the hydrogen electrode 20. The current collector 21 is also electrically connected to the hydrogen electrode 20.

Figure 6:
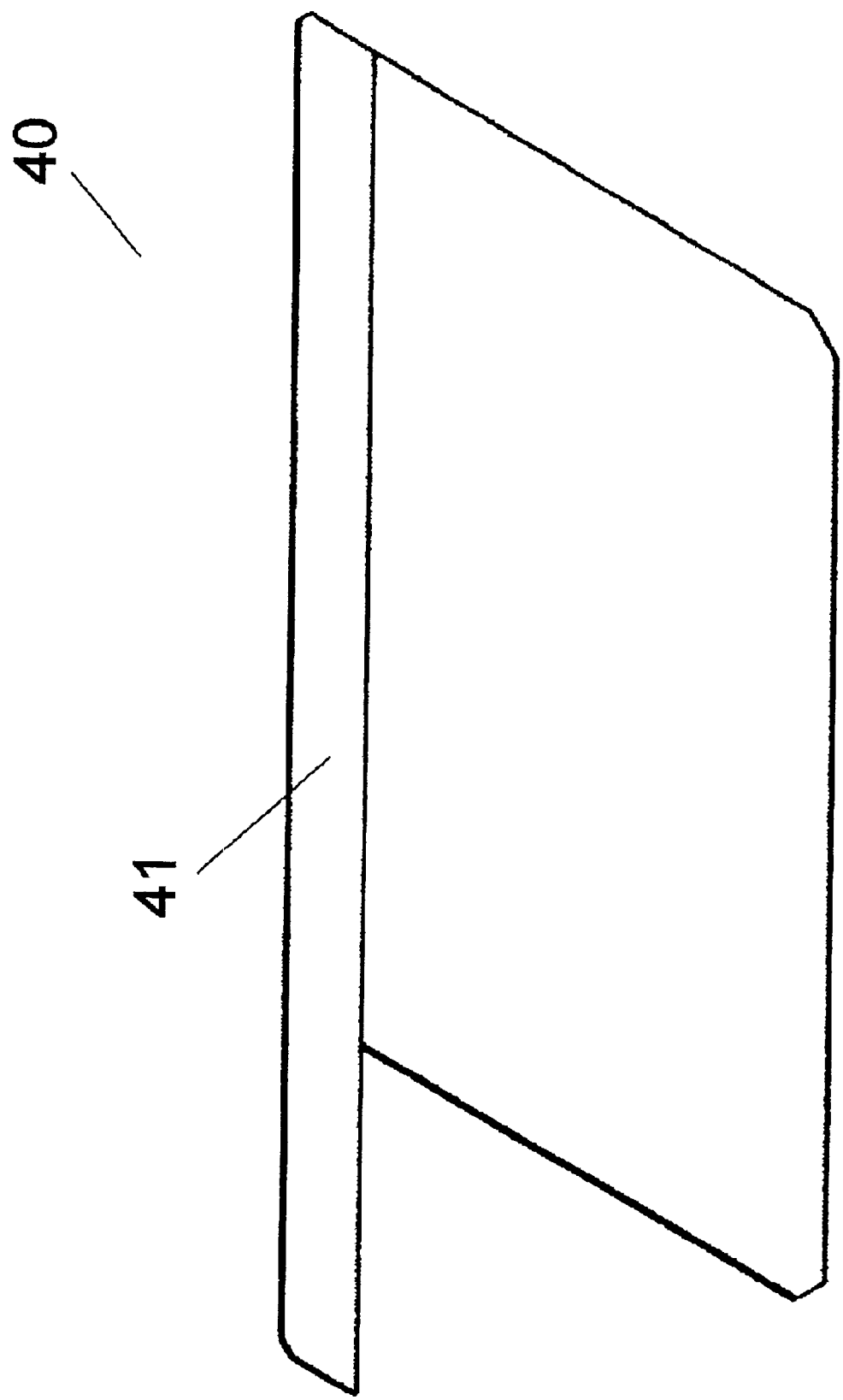
FIG. 6, shows a detailed view of an oxygen electrode in accordance with the present invention.

Each fuel cell also contains at least one oxygen electrode 40. A more detailed view of an oxygen electrode in accordance with the present invention is shown in FIG. 6. The oxygen electrode is substantially rectangular in shape. An aspect ratio of 1 to 1 for the hydrogen electrode is preferred optimize current distribution and current collect-on, however, other aspect ratios may be used in accordance with the present invention. The oxygen electrode is flat with a current collector 41 running along one of the longer sides of the oxygen electrode 40. The current collector 41 is also electrically connected to the oxygen electrode 40.

Figure 7:
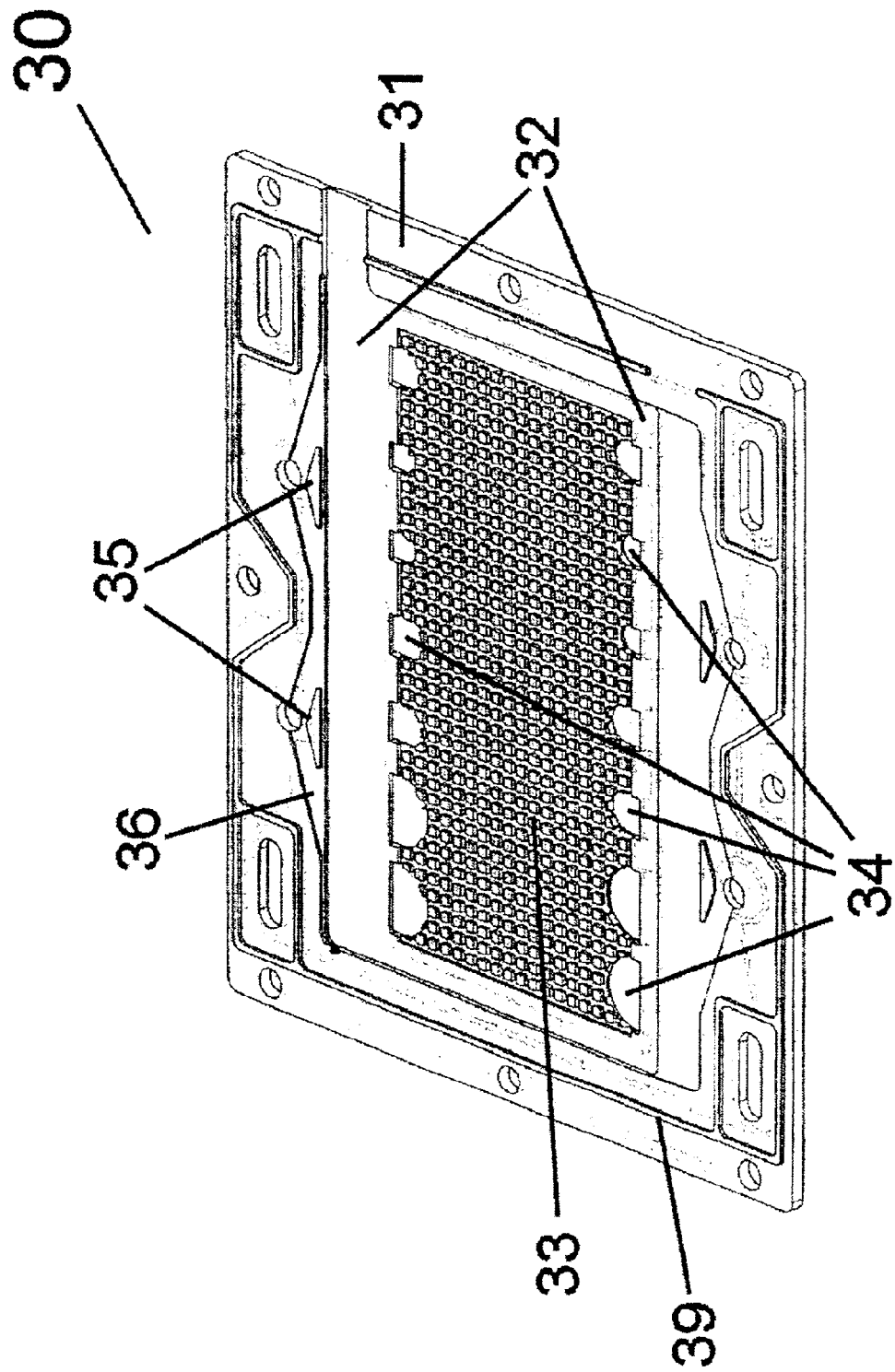
FIG. 7, shows a detailed view of the inner side of a hydrogen electrode plate in accordance with the present invention.
Figure 8:
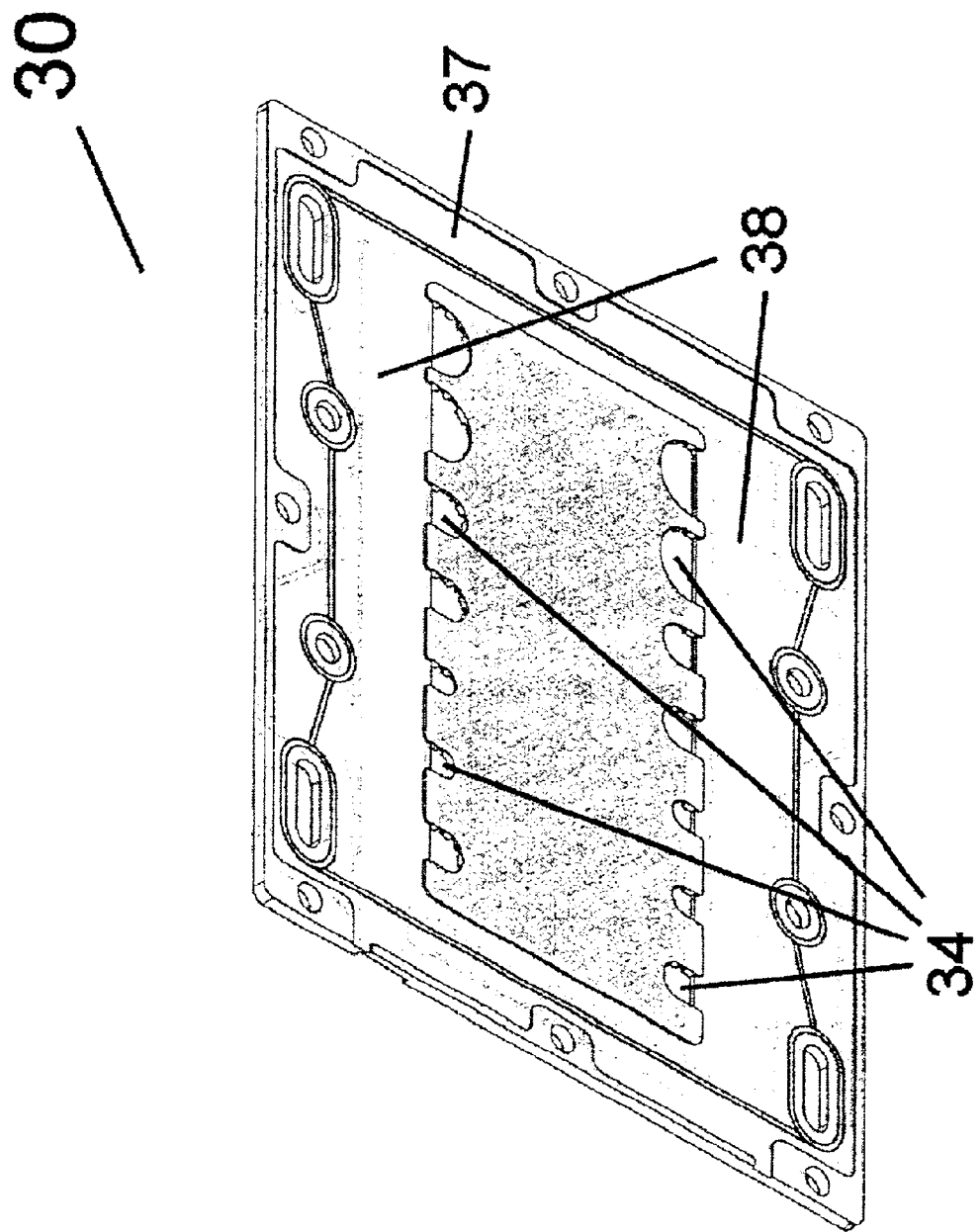
FIG. 8, shows a detailed view of the outer side of a hydrogen electrode plate in accordance with the present invention.
Figure 9:
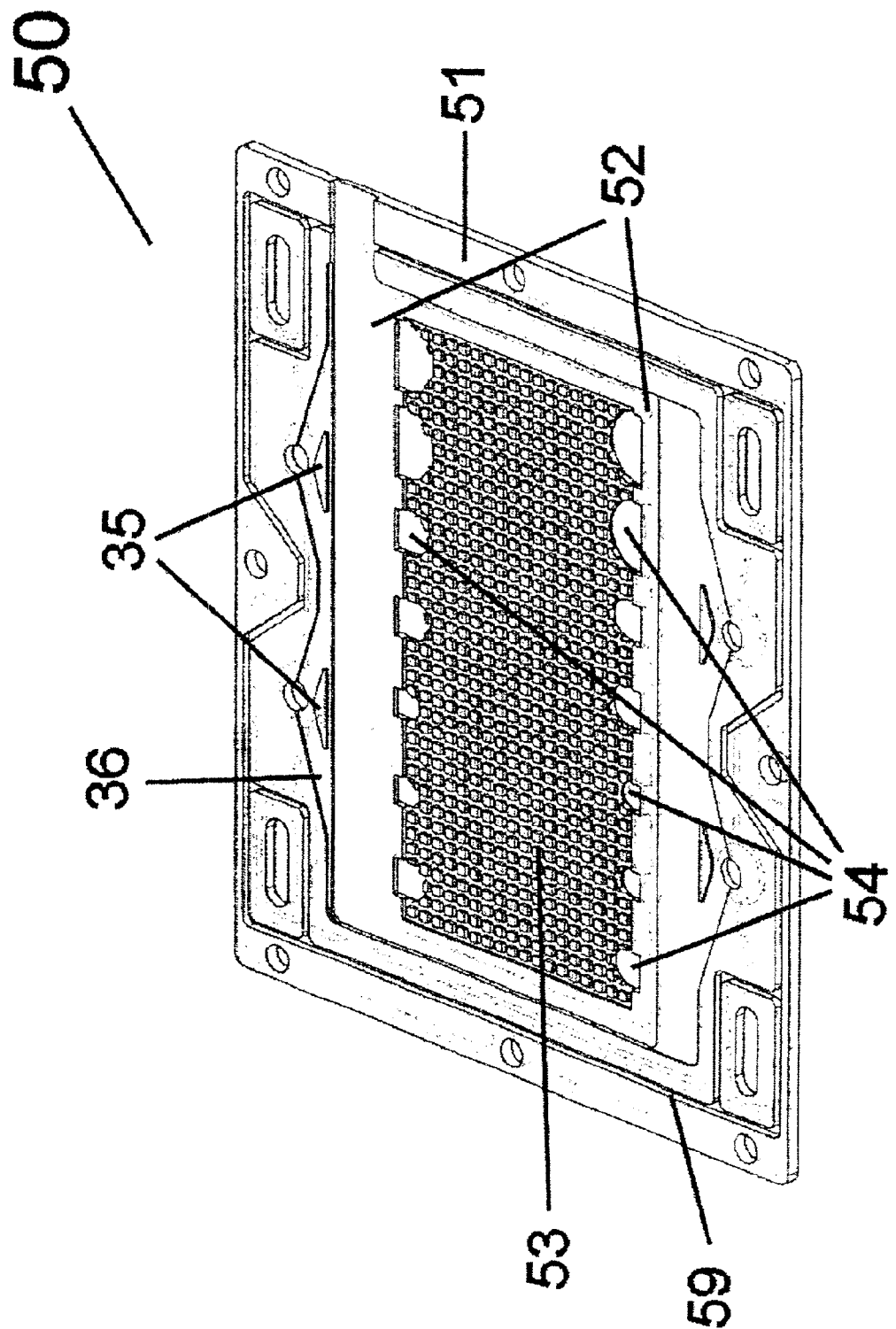
FIG. 9, shows a detailed view of the inner side of an oxygen electrode plate in accordance with the present invention.
Figure 10:
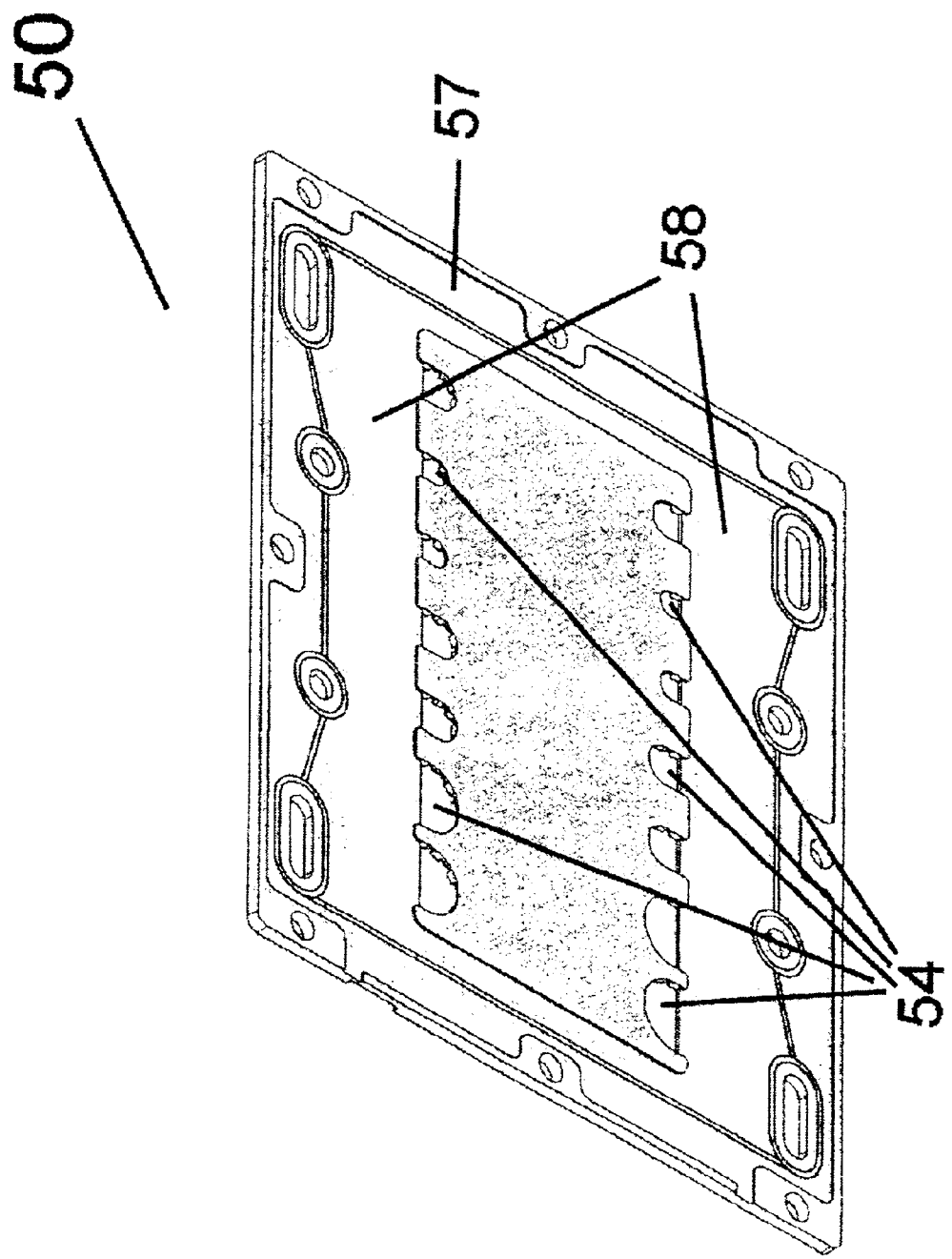
FIG. 10, shows a detailed view of the outer side of an oxygen electrode plate in accordance with the present invention.
Figure 11:
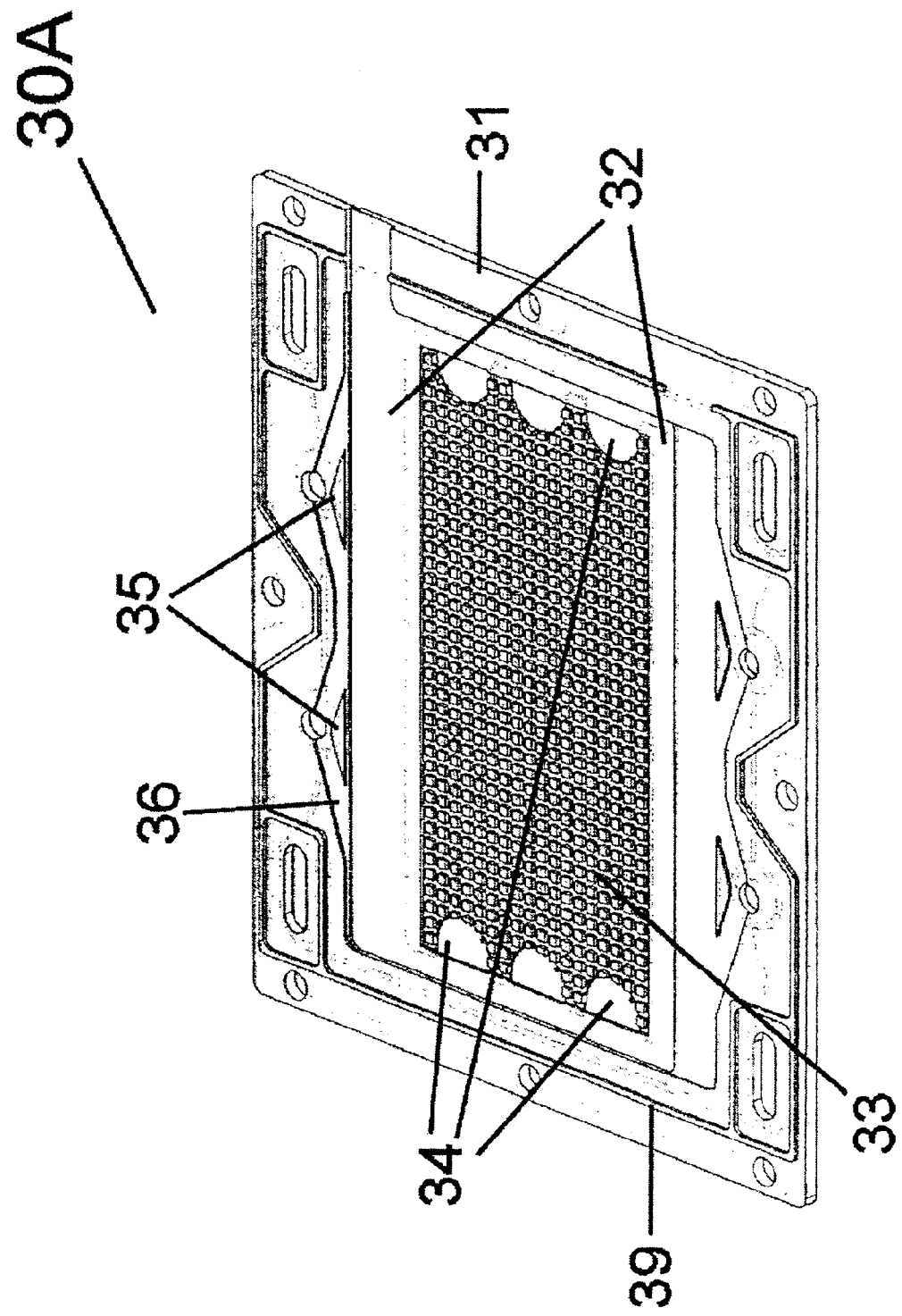
FIG. 11, shows a detailed view of the inner side of a hydrogen electrode plate in accordance with the alternative embodiment of the present invention.
Figure 12:
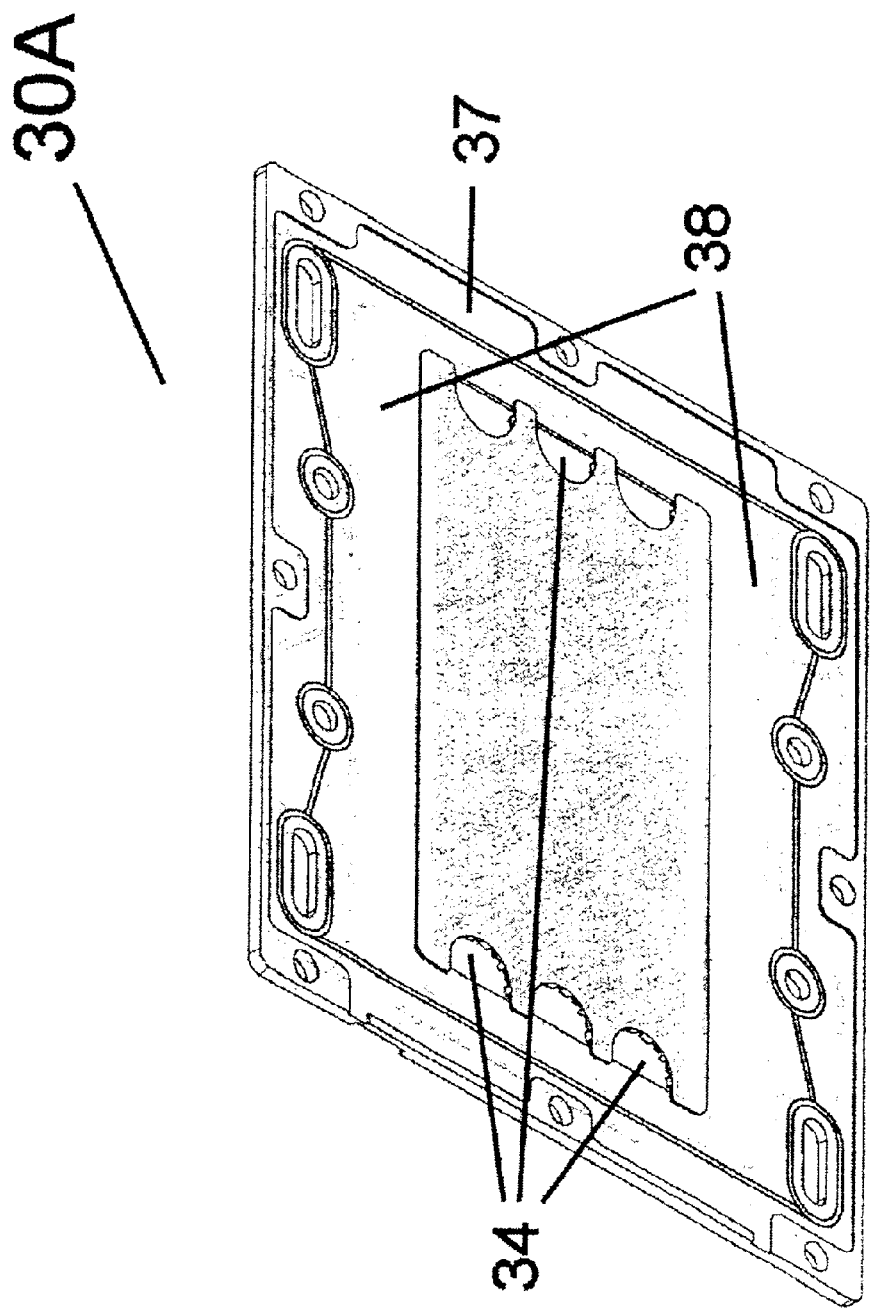
FIG. 12, shows a detailed view of the outer side of a hydrogen electrode plate in accordance with the alternative embodiment of the present invention.
Figure 13:
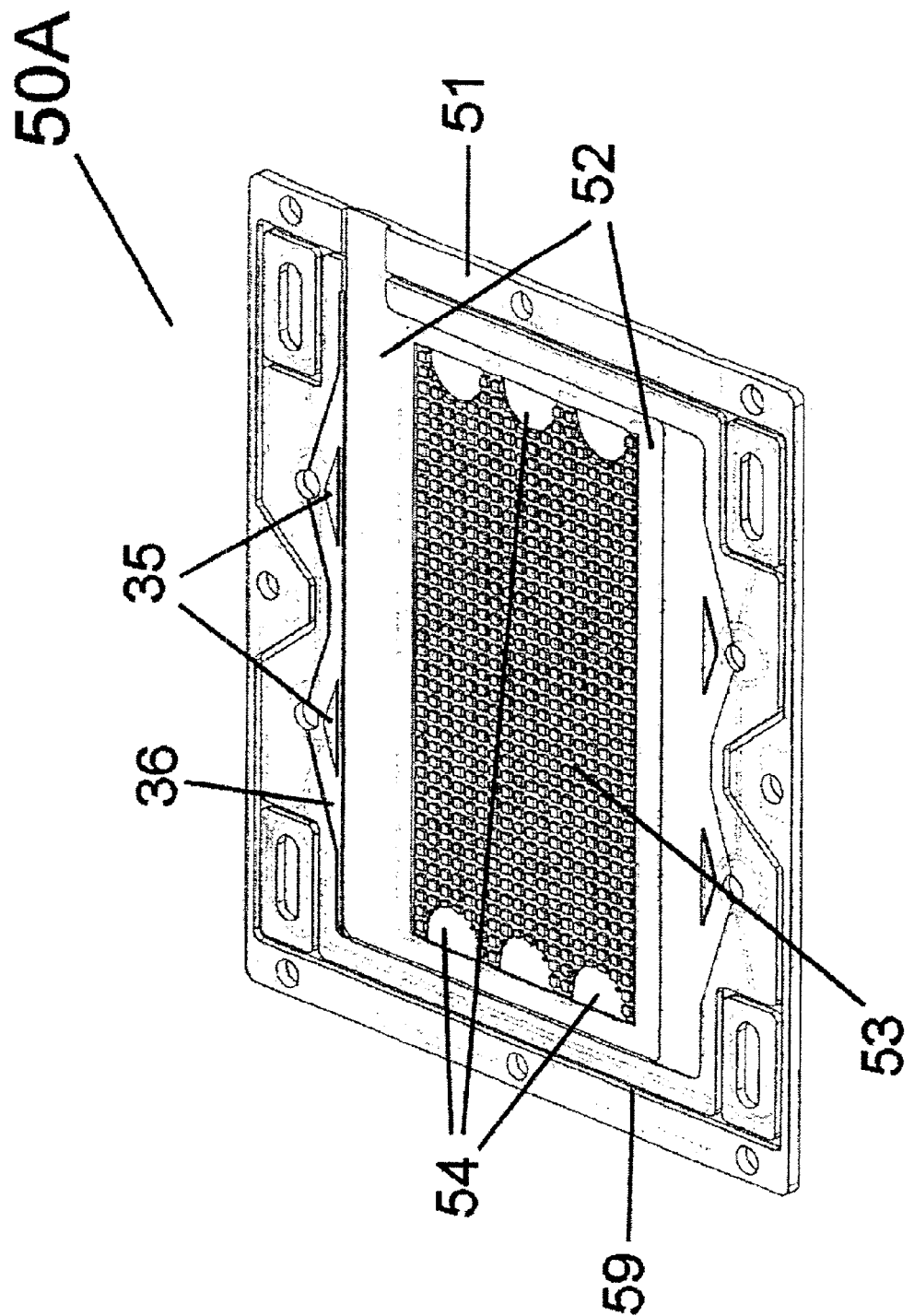
FIG. 13, shows a detailed view of the inner side of an oxygen electrode plate in accordance with the alternative embodiment of the present invention.
Figure 14:
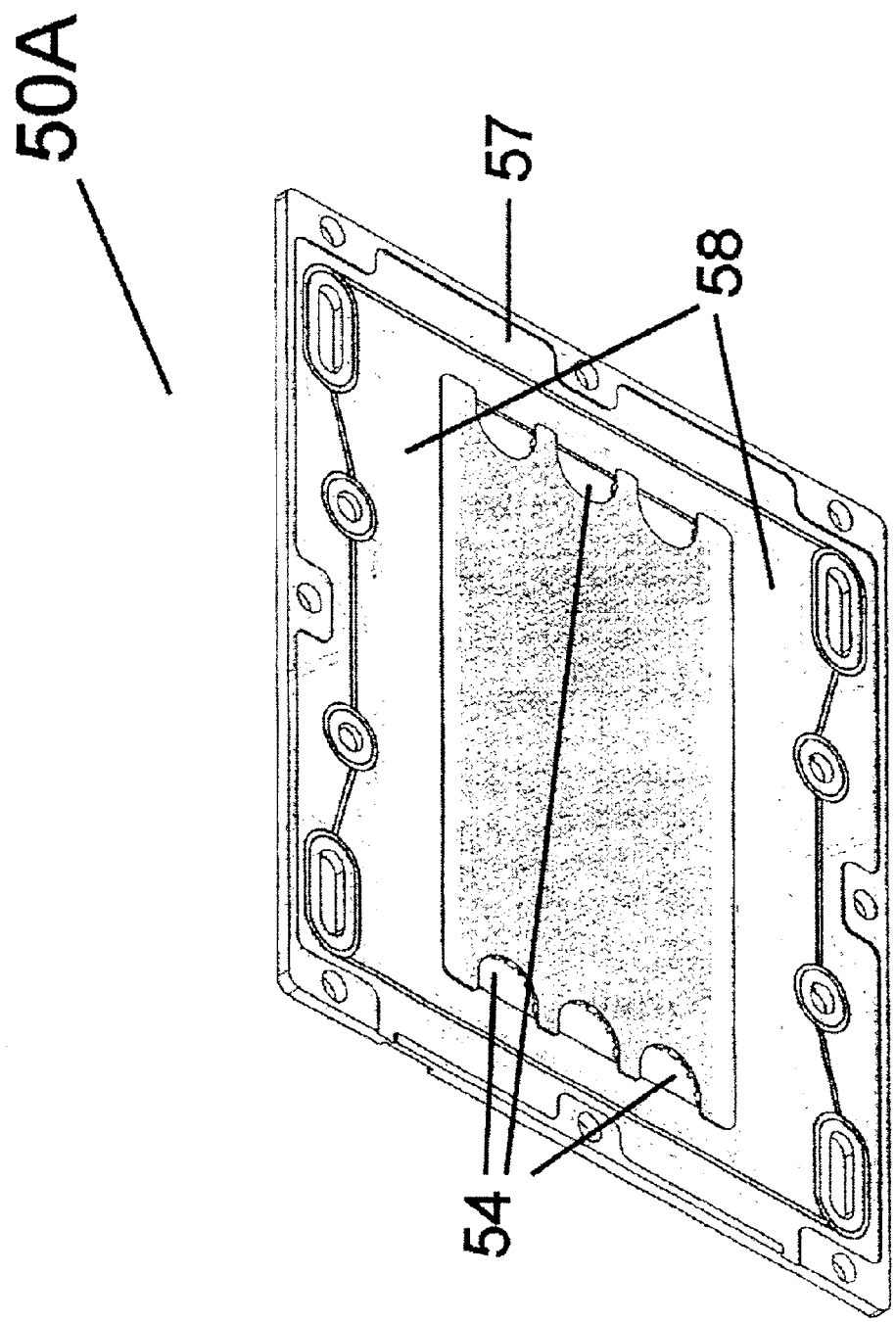
FIG. 14, shows a detailed view of the outer side of an oxygen electrode plate in accordance with the alternative embodiment of the present invention.

The hydrogen electrode 20 is placed in a hydrogen electrode plate 30 and the oxygen electrode 40 is placed in an oxygen electrode plate 50. Each plate has an inner side and an outer side. A detailed view of the hydrogen electrode plate can be seen in FIG. 7 and FIG. 8. A detailed view of the oxygen electrode plate can be seen in FIG. 9 and FIG. 10. The inner side 31 of the hydrogen electrode plate 30 has a depression 32 into which the hydrogen electrode 20 fits and the inner side 51 of the oxygen electrode plate 50 has a depression 52 into which the oxygen electrode 40 fits. The depression 32 in the hydrogen electrode plate 30 and the depression 52 in the oxygen electrode plate 50 are slightly larger than the electrodes thereby allowing for expansion of the electrodes. A plurality of hydrogen flow channels 33 extend across the face of the depression in the inner side 31 of the hydrogen electrode plate 30 and a plurality of oxygen flow channels 53 extend across the face of the depression 52 in the inner side 51 of the oxygen electrode plate 50. The hydrogen electrode plate has a plurality of holes 34 through which hydrogen flows from the outer side 37 of the hydrogen electrode plate to the inner side 31 of the hydrogen electrode plate, thus flowing through the hydrogen flow channels 33 on the inner side 31 of the hydrogen electrode plate 30 and contacting the hydrogen electrode 20. The oxygen electrode plate 50 has a plurality of holes 54 through which the oxygen stream flows from the outer side 57 of the oxygen electrode plate to the inner side 51 of the oxygen electrode plate, thus flowing through the oxygen flow channels 53 on the inner side 51 of the oxygen electrode plate 50 and contacting the oxygen electrode 40. The holes in the hydrogen electrode plate and the holes in the oxygen electrode plate may have different sizes to optimize flow of the hydrogen stream or the oxygen stream across the respective electrodes. Preferably, the holes are configured to allow the hydrogen and oxygen stream to flow vertically across the hydrogen electrode and the oxygen electrode. This allows the hydrogen stream and oxygen stream to have a shorter path across the electrodes thus optimizing performance of the fuel cell. The electrode plates may also be configured to allow the hydrogen stream and the oxygen stream to flow laterally across the electrodes. This design is utilized in an alternative embodiment 10A of the fuel cell of the present invention. The alternative embodiment of the hydrogen electrode plate 30A is shown in FIG. 11 and FIG. 12. The alternative embodiment of the oxygen electrode plate 50A is shown in FIG. 13 and FIG. 14. Same reference numbers refer to the same elements in the different embodiments.

Once the hydrogen electrode 20 and the oxygen electrode 40 are placed in their respective plates, an electrolyte chamber 60 is placed between the hydrogen electrode 20 and the oxygen electrode 40 and the plates are adhered together to form an electrode chamber. The inner side 31 of the hydrogen electrode plate 30 and the inner side 51 of the oxygen electrode plate 50 have flow distributing structures 35 located within electrolyte flow channels 36 which evenly distribute the electrolyte solution through the electrolyte chamber when the hydrogen electrode plate 30 and the oxygen electrode plate 50 are adhered together, thereby eliminating the need or manifolds while maintaining low pressure throughout the fuel cell. The flow distributing structures 35 may also provide mechanical support to the fuel cell. The flow distributing structures 35 are located where the electrolyte solution enters the electrode chamber. The flow distributing structures 35 preferably have a triangular shape, however circular or other polygonal shapes may be used in accordance with the present invention. The hydrogen electrode plate 30 and the oxygen electrode plate 50 together form the flow distributing structures 35. One half of the flow distributing structures 35 protrude from each plate and when the plates are pressed together the halves line up and form the flow distributing structures 35. The flow distributing structures 35 extend from the hydrogen electrode plate 30 to the oxygen electrode plate 50 and force the electrolyte solution flowing through the electrolyte flow channels to flow around them, thereby evenly distributing the electrolyte solution between the hydrogen electrode 20 and oxygen electrode 40.

The outer side 37 of the hydrogen electrode plate 30 has a depression 38 into which a rubber compression plate 70 fits and the outer side 57 of the oxygen electrode plate 50 has a depression 58 into which a second compression plate 70 fits. The thickness of the compression plate 70 may be greater than the depth of the depression in the outer side of the hydrogen electrode plate 37 and the depression in the outer side of the oxygen electrode plate 57 to provide mechanical support and proper sealing within the fuel cell 10.

The hydrogen electrode plate and the oxygen electrode plate are substantially similar, however, the hydrogen electrode plate 30 has a tongue 39 along its edge which fits into a groove 59 along the edge of the oxygen electrode plate 50. This tongue and groove design allows for proper assembly of the fuel cell and provides an area for epoxy or another adhering substance to be placed for securing the two plates.

Figure 15:
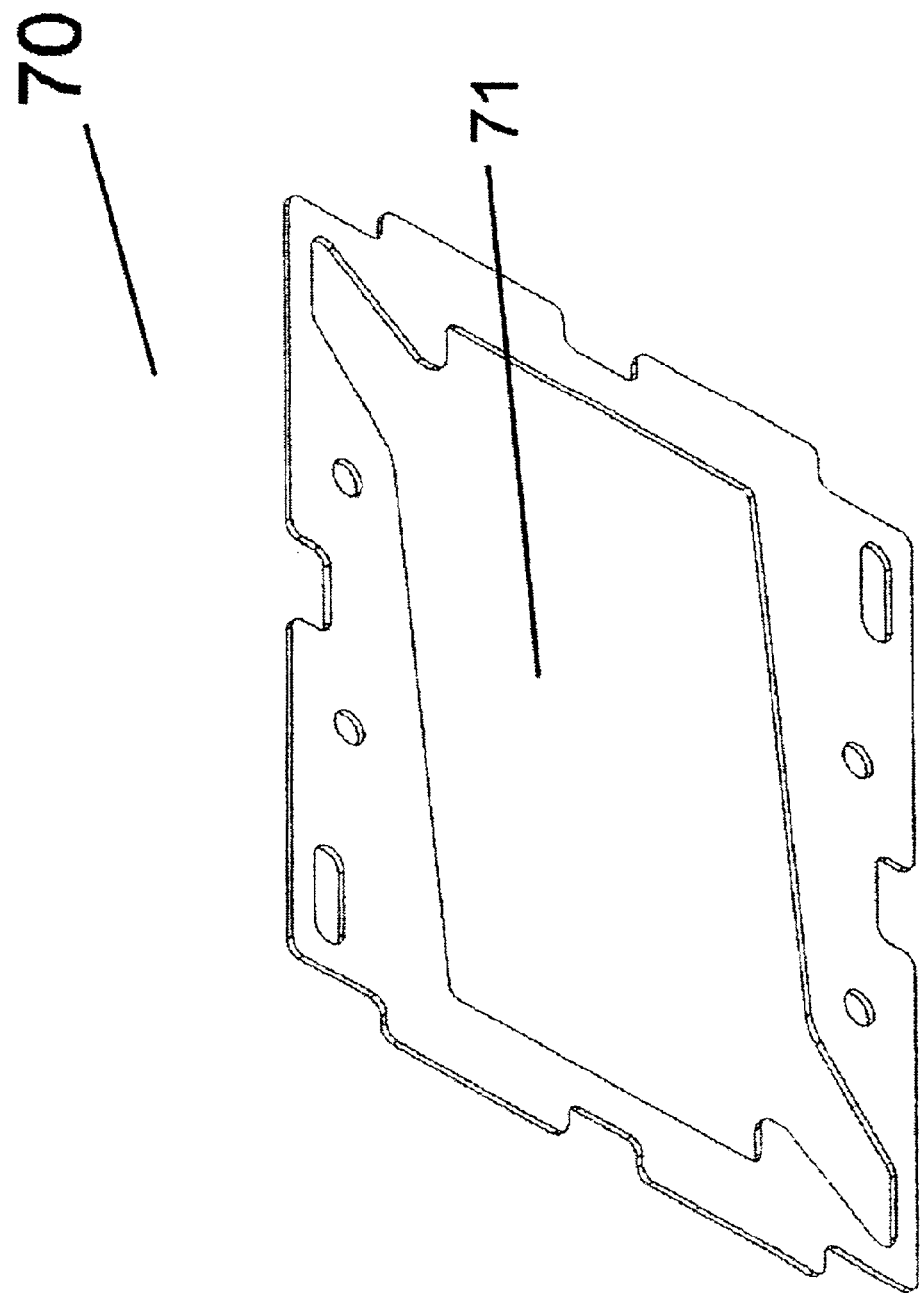
FIG. 15, shows a detailed view of a compression plate in accordance with the present invention.
Figure 16:
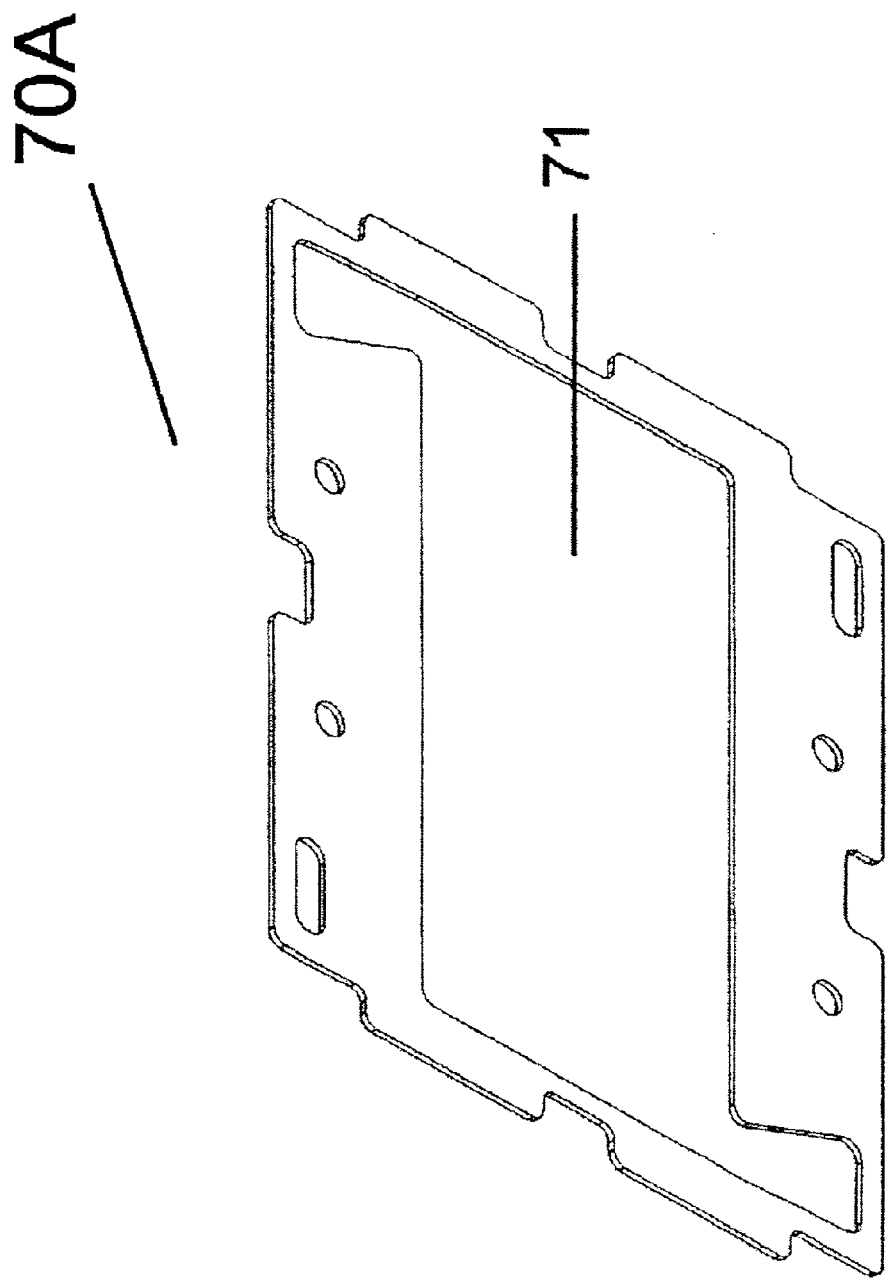
FIG. 16, shows a detailed view of a compression plate in accordance with the alternative embodiment of the present invention.

Compression plates 70 are inserted into the fuel cell to absorb volumetric expansion of the electrodes, distribute hydrogen and oxygen across the respective electrodes, and help maintain mechanical support of the fuel cell stack. A detailed view of a rubber compression plate in accordance with the present invention is shown in FIG. 15. A detailed view of compression plate 70A in if accordance with the alternative embodiment of the present invention implementing lateral flow of the hydrogen stream and the oxygen stream across the electrodes is shown in FIG. 16. The compression plates are placed in contact with the outer sides of the hydrogen electrode plate and the oxygen electrode plate. The compression plates 70 have cutout sections 71 which direct the hydrogen stream to a plurality of holes 34 in the hydrogen electrode plate and direct the oxygen steam to a plurality of holes 54 in the oxygen electrode plate. The compression plates are located between the electrode end plates 80 and the electrode plates. The compression plates are also designed to absorb expansion of the electrodes in the Z direction as the electrodes expand and contract as hydrogen and oxygen are absorbed and reacted by the respective electrodes. The compression plates may be constructed from any rubber type material, however the rubber material must not be reactive with the alkaline electrolyte solution and must be able to withstand the operating temperatures of the fuel cell.

Figure 17:
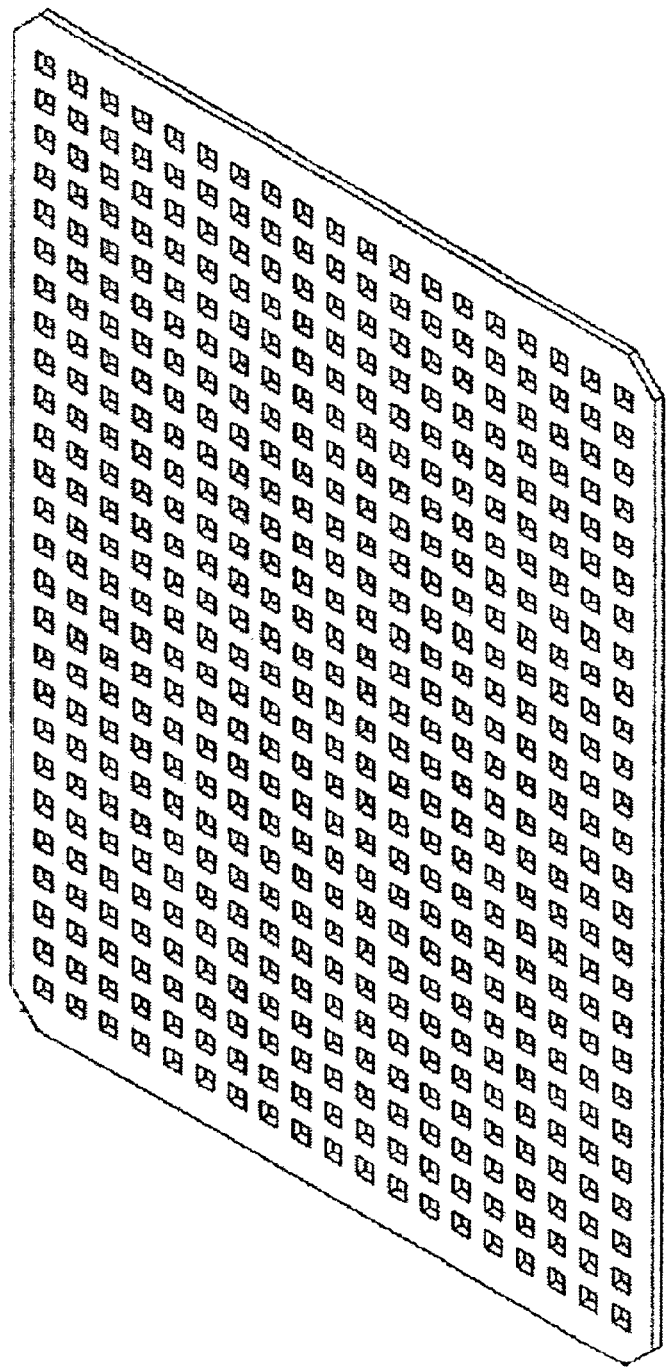
FIG. 17, shows a detailed cross sectional view of the electrolyte chamber in accordance with the present invention.

Electrolyte chambers may be used to maintain mechanical support within the fuel cell while creating an electrolyte chamber which allows the electrolyte solution to flow throughout the fuel cell. A more detailed view of an electrolyte chamber in accordance with the present invention is shown in FIG. 17. The electrolyte chambers 60 may be composed of an expanded polyolefin sheet having a thin membrane on each side. The membrane helps prevent excess 11 electrolyte from contacting the electrode and also prevents hydrogen or oxygen from penetrating into the electrolyte solution. The electrolyte chamber 60 may be placed between the hydrogen electrode 20 and the oxygen electrode 40 in the fuel cell. The electrolyte chamber may be in direct contact with the electrodes. While the electrolyte chamber is preferably constructed from an expanded polyolefin sheet, any porous material that allows unrestricted flow throughout its structure while maintaining mechanical support of the fuel cell may be substituted. The porous material must also be one that does not react with the alkaline electrolyte solution and must be able to withstand the operating temperatures of the fuel cell. Inside the electrolyte chamber, the electrolyte solution contacts the hydrogen electrode 20 and the oxygen electrode 40. The electrolyte solution enters the fuel cell and flows through the electrolyte chamber 60. After passing through the electrolyte chamber, the electrolyte solution flows out of the fuel cell.

The hydrogen electrode may be generally composed of an anode active material having hydrogen storage capacity. The anode active material is designed to have a high density of active catalytic sites, resistance to poisoning, and long operating life to provide efficient low cost fuel cell operation.

An anode active material of the instant invention may be a composite of a hydrogen storage material and an additional catalytic material. The preferable anode active material is one which can reversibly absorb and release hydrogen irrespective of the hydrogen storage capacity and has the properties of a fast hydrogenation reaction rate, a good stability in the electrolyte and a long shelf-life. It should be noted that, by hydrogen storage capacity, it is meant that the material stores hydrogen in a stable form, in some nonzero amount higher than trace amounts. Preferred materials will store about 0.1 weight % hydrogen or more. Preferably, the alloys include, for example, rare-earth/Misch metal alloys, zirconium and/or titanium alloys or mixtures thereof. The hydrogen electrode material may even be layered such that the material on the hydrogen contacting surface is formed from a material which has been specifically designed to be highly catalytic to the dissociation of molecular hydrogen into atomic hydrogen, while the material on electrolyte contacting surface is designed to be highly catalytic to the electrochemical oxidation of hydrogen.

Certain hydrogen storage materials are exceptionally useful as alkaline fuel cell hydrogen electrode materials. The useful hydrogen storage alloys have excellent catalytic activity for the formation of hydrogen atoms from molecular hydrogen and also have superior catalytic activity toward the electrochemical oxidation of hydrogen atoms. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the hydrogen electrode; and 2) as an internal hydrogen storage buffer to insure that a ready supply of hydrogen atoms is always available at the electrolyte interface.

Specific alloys useful as the hydrogen electrode material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The density of Ni regions in the alloys provide powder particles having an enriched Ni surface. The most preferred alloys having enriched Ni regions are alloys having the following composition:

where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent. Such materials are disclosed in U.S. Pat. No. 5,536,591 to Fetcenko et al., published Jul. 16, 1996, the disclosure of which is hereby incorporated by reference.

Figure 18:
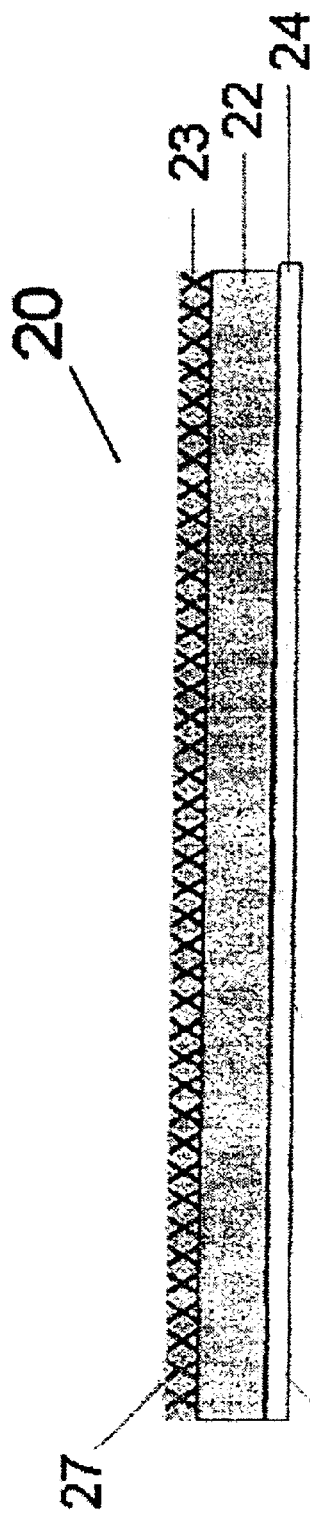
FIG. 18, shows a cross sectional view of the preferred embodiment of the hydrogen electrode in accordance with the present invention.

The hydrogen electrode 20 in the preferred embodiment of the present invention has a layered structure and is shown in FIG. 18. The layered structure promotes hydrogen dissociation and absorption within the hydrogen electrode 20. Each hydrogen electrode is composed of an active material layer 22, a current collector grid 23, and a porous polytetrafluoroethylene layer 24. The active material layer 22 is disposed between the current collector grid 23 and the polytetrafluoroethylene layer 24. The active material layer 22 may be dispersed throughout the current collector grid 23. Examples of current collector grids include, but are not limited to, mesh, grid, matte, expanded metal, foil, foam and plate. The preferable current collector grid is a conductive mesh having 40 wires per inch horizontally and 20 wires per inch vertically. The wires comprising the mesh may have a diameter between 0.005 inches and 0.01 inches, preferably between 0.005 inches and 0.008 inches. This design provides optimal current distribution due to the reduction of the ohmic resistance. Where more than 20 wires per inch are vertically positioned, problems may be encountered when affixing the active material to the substrate. The current collector grid may be composed of a conductive material such as nickel. Other conductive materials may be substituted as required by design constraints. The polytetrafluoroethylene layer 24 may be approximately 0.0007 inches thick. The current collector grid 23 is on the electrolyte contacting side of the hydrogen electrode 20 and the polytetrafluoroethylene layer 24 is on the hydrogen contacting side of the hydrogen electrode 20.

The active material layer 22 may be composed of Misch metal nickel alloy, Raney nickel, graphite, and polytetrafluoroethylene powder. A preferred composition of the active material layer 23 is by weight 35% Misch metal nickel alloy, 46% Raney nickel, 4% graphite, and 15% polytetrafluoroethylene. The most preferred Misch metal nickel alloy has the following composition by weight percent:
50.07% Ni, 10.62% Co, 4.6% Mn, 1.8% Al, 20.92% La, 8.63% Ce, 0.87% Pr, and 2.49% Nd. The graphite may be one with isotropic shape having high electrical and thermal conductivity. A typical example of such graphite is called TIMREX KS-75 (Trademark of Timcal Group). Raney nickel and polytetrafluoroethylene are well known in the art and do not need any further discussion.

The oxygen electrode may contain an active material component which is catalytic to the dissociation of molecular oxygen into atomic oxygen, catalytic to the formation of hydroxyl ions (OH⁻) from water and oxygen ions, corrosion resistant to the electrolyte, and resistant to poisoning. A material useful as an active material in the oxygen electrode is on a host matrix including at least one transition metal element which is structurally modified by the incorporation of at least one modifier element to enhance its catalytic properties. Such materials are disclosed in U.S.

U.S. Pat. No. 4,430,391 ('391) to Ovshinsky, et al., published Feb. 7, 1984, the disclosure of which is hereby incorporated by reference. Such a catalytic body is based on a disordered lt non-equilibrium material designed to have a high density of catalytically active sites, resistance to poisoning and long operating life. Modifier elements, such as La, Al, K, Cs, Na, Li, Ga, C, and O structurally modify the local chemical environments of the host matrix including one or more transition elements such as Mn, Co and Ni to form the catalytic materials of the oxygen electrode. These low over-voltage, catalytic materials increase operating efficiencies of the fuel cells in which they are employed.

The oxygen electrode may be formed the same as conventional oxygen electrodes which use platinum catalysts, but the non-noble-metal catalysts described above are substituted for the platinum. The non-noble catalysts are finely divided and disbursed throughout a porous carbon matte-like material. The material may or may not have a conductive substrate as needed.

The fuel cell oxygen electrodes of this invention may also utilize redox couples, particularly metal/oxides couples selected from the group of metals consisting of copper, silver, zinc, cobalt and cadmium. These types of oxygen electrodes are discussed in detail in the commonly owned copending application Ser. No. 90/737,332, the disclosure of which is hereby incorporated by reference.

The oxygen electrodes of the instant invention may also it include a catalytic material which promotes and speeds the dissociation of molecular oxygen into atomic oxygen (which reacts with the redox couple). A particularly useful catalyst is carbon. This carbon should be very porous and may be electrically conductive.

The oxygen electrode also needs a barrier means to isolate the electrolyte, or wet, side of the oxygen electrode from the gaseous, or dry, side of the oxygen electrode. A beneficial means of accomplishing this is by inclusion of a hydrophobic component comprising a halogenated organic compound, particularly polytetrafluoroethylene (PTFE) within the electrode.

The oxygen electrodes, may also include a current collector grid or current collecting system extending within said active material. The current collector may comprise an electrically conductive mesh, grid, foam or expanded metal. The most preferable current collector grid is a conductive mesh having 40 wires per inch horizontally and 20 wires per inch vertically. The wires comprising the mesh may have a diameter between 0.005 inches and 0.01 inches, preferably between 0.005 inches and 0.008 inches. This design provides optimal current distribution due to the reduction of the ohmic resistance. Where more than 20 wires per inch are vertically positioned, problems may be encountered when affixing the active material to the substrate.

Figure 19:
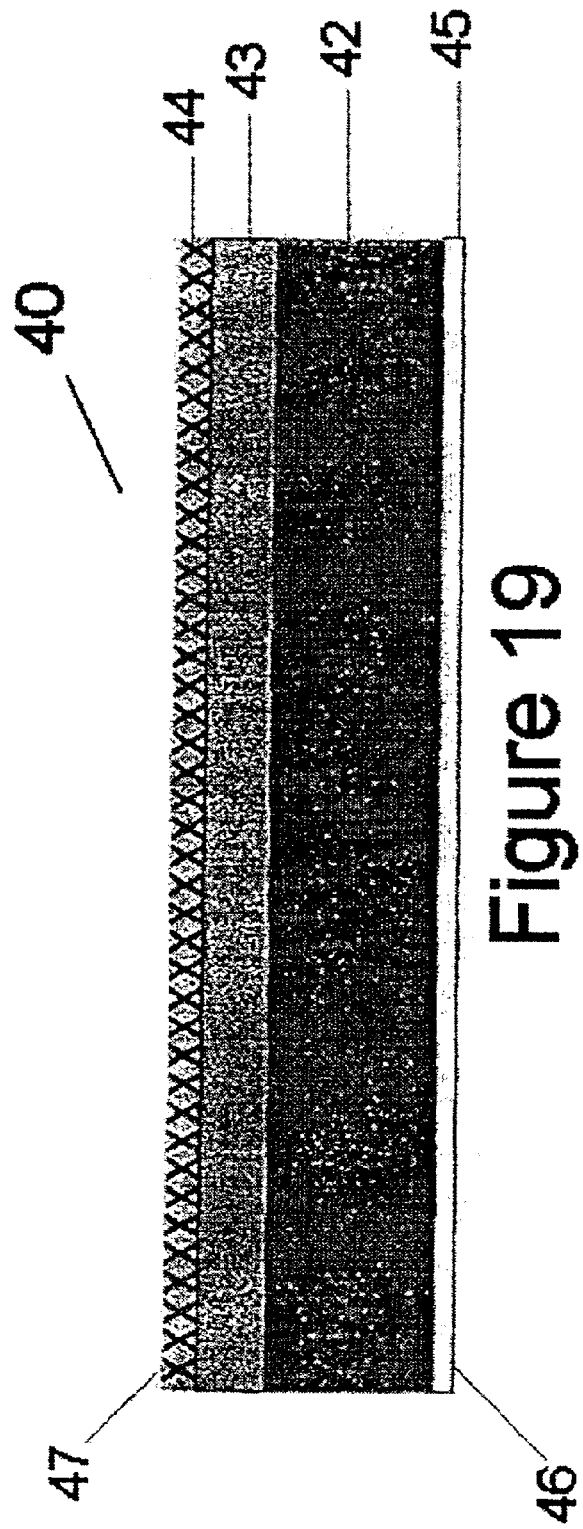
FIG. 19, shows a cross sectional view of the preferred embodiment of the oxygen electrode in accordance with the present invention.

The oxygen electrodes in the preferred embodiment of the present invention have a layered structure and are shown in FIG. 19. The layered structure promotes oxygen dissociation and absorption within the oxygen electrode 40. Each oxygen electrode 40 is composed of an A layer 42, a B layer 43, a current collector grid 44, and a polytetrafluoroethylene layer 45. The A layer 42 may be composed of carbon particles coated with polytetrafluoroethylene. The carbon particles may be carbon black known as Vulcan XC-72 carbon (Trademark of Cabot Corp.), which is well known in the art. The A layer 42 may contain approximately 40 percent by weight polytetrafluoroethylene with the remainder consisting of carbon particles. The B Layer may be composed of the A layer material and additional carbon particles, graphite and silver oxide. The B layer 43 may contain approximately 50 percent of the material of the A layer, 15 percent carbon, 15 percent graphite and 20 percent silver oxide. The carbon added to the B layer 43 is carbon black known as Black Pearl 2000 (Trademark of Cabot Corp.). The graphite is preferably TIMREX SFG 44 graphite (Trademark of Timcal Group). The silver oxide may also contain a lithium-aluminum alloy, gallium, or other modifiers for improved performance.

Reactive elements such as lithium may be added to the redox couple in the form of a non-reactive alloy such as a LiAl alloy. That is, lithium alone as an individual element is extremely reactive with oxygen and water vapor, therefore it is advisable to incorporate the element into the redox couple in the form of an alloy with aluminum which is not reactive in this way. Other elements which may be alloyed with the lithium include boron and silicon. Specifically the LiAl alloy is a 50:50 At. % alloy. Ga may also be added to the silver oxide. Specific examples of silver oxides containing an Li—Al alloy or Ga are shown in Table 1. Such materials are disclosed in commonly owned copending application Ser. No. 09/797,332, filed Mar. 1, 2001, the disclosure of which is hereby incorporated by reference.

TABLE 1

| Sample Description | Analysis (ICP for 1–6; EDS rest) |
|---|---|
| 5% LiAl, 95% Ag from nitrates | Li: 0.006%, Al: 0.07%, Ag: 99.924% |
| 1% LiAl, 99% Ag from alloy | Li: 0.001, Ag 99.999% |
| 10% LiAl, 90% Ag from alloy | Li: 0.82%, Al: 5.16%, Ag: 94.02 |
| 5% LiAl, 95% Ag from alloy | Li: 0.034%, Al: 0.29%, Ag: 99.676% |
| LiAl, Ag | Ag: 100% |
| 1% Ga, 99% Ag | Ag: 100% |
| 5% Ga, 95% Ag | Ga: 0.7%, Ag: 99.3% |

The current collector grid 44 is placed on top of the B layer 43 which is placed on top of the A layer 42. The B layer 43 may be dispersed throughout the current collector grid 44. Examples of current collector grids include, but are not limited to, mesh, grid, matte, expanded metal, foil, foam and plate. The current collector grid may be composed of a conductive material such as nickel. Other conductive materials may be substituted as required by design constraints. The other side of the A layer 42 is coated with a film of polytetrafluoroethylene 45. The nickel wire mesh is in contact with the electrolyte solution and the polytetrafluoroethylene layer is in contact with the oxygen stream.

Figure 20:
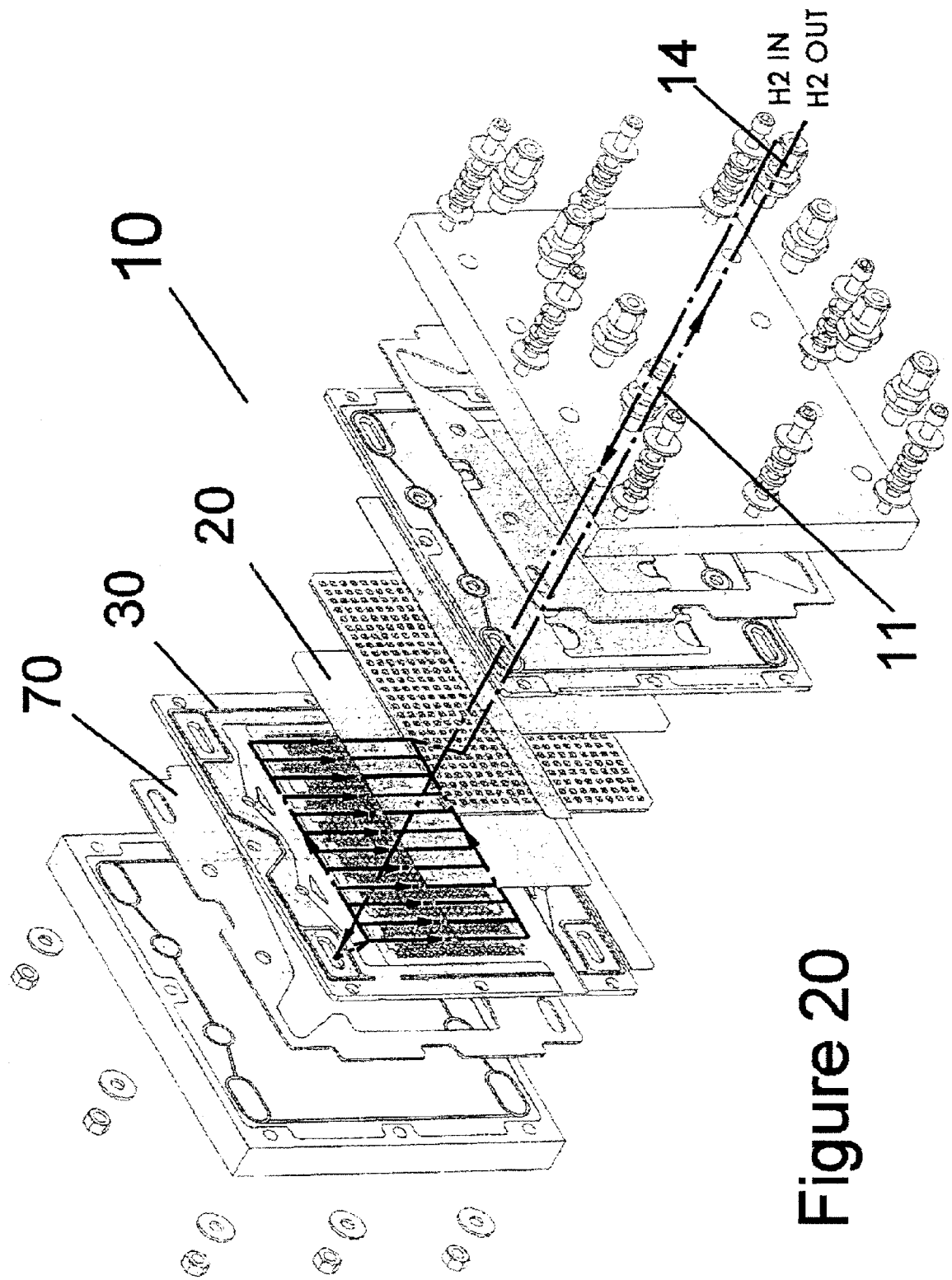
FIG. 20, is an exploded view of the fuel cell of the present invention, specifically shown is the flow of hydrogen through the fuel cell.
Figure 21:
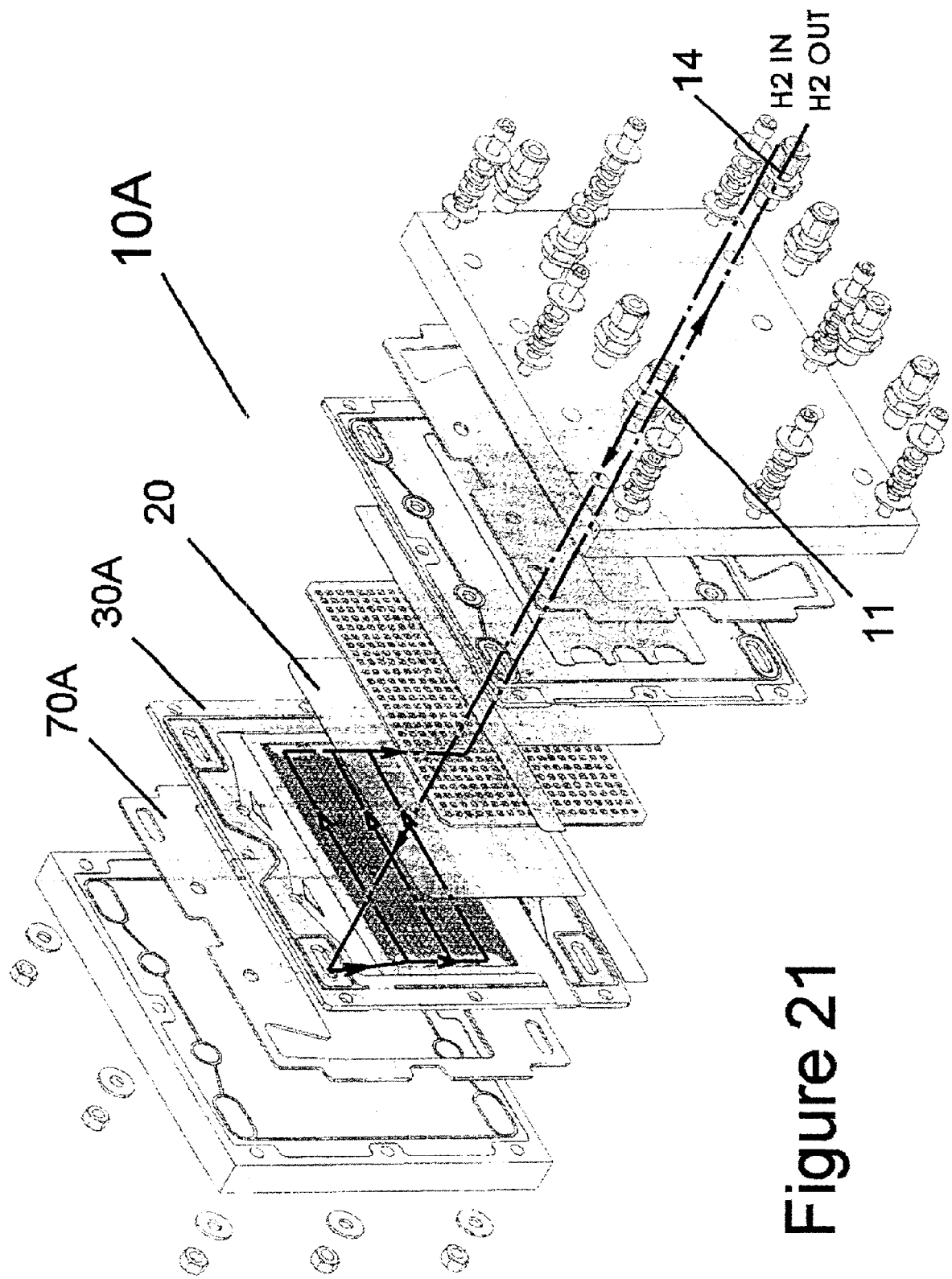
FIG. 21, is an exploded view of the alternative embodiment of the fuel cell of the present invention, specifically shown is the flow of hydrogen through the fuel cell.

The flow of hydrogen through the fuel cell is shown in FIG. 20. Hydrogen enters the fuel cell 10 through the hydrogen inlet 11 and flows to the outer side of the hydrogen electrode frame 30. The hydrogen is then distributed through the hydrogen electrode frame 30 and across the hydrogen contacting side 26 of the hydrogen electrode 20 through flow channels formed in the compression plate 70 in contact with the outer side of the hydrogen electrode frame 33. Hydrogen is absorbed through the hydrogen contacting surface 26 into the hydrogen electrode 20. The absorbed hydrogen is catalytically broken down by the anode active material into atomic hydrogen which is stored in the hydrogen storage material as a hydride. The stored atomic hydrogen then finally reacts at the electrolyte contacting surface 27 with hydroxyl ions to form water. It should be noted that the heat of hydride formation may help to warm the fuel cell to it's optimal operating temperature. Any unabsorbed hydrogen and other contaminant gases or water vapor in the hydrogen supply are vented through the hydrogen outlet 14. The vented gases may be recycled if enough hydrogen is present to warrant recovery. Otherwise the hydrogen may be used to provide a source of thermal energy if needed for other components such as a hydride bed hydrogen storage tank. The flow of hydrogen through the alternate embodiment of the fuel cell 10A is shown in FIG. 21.

Figure 22:
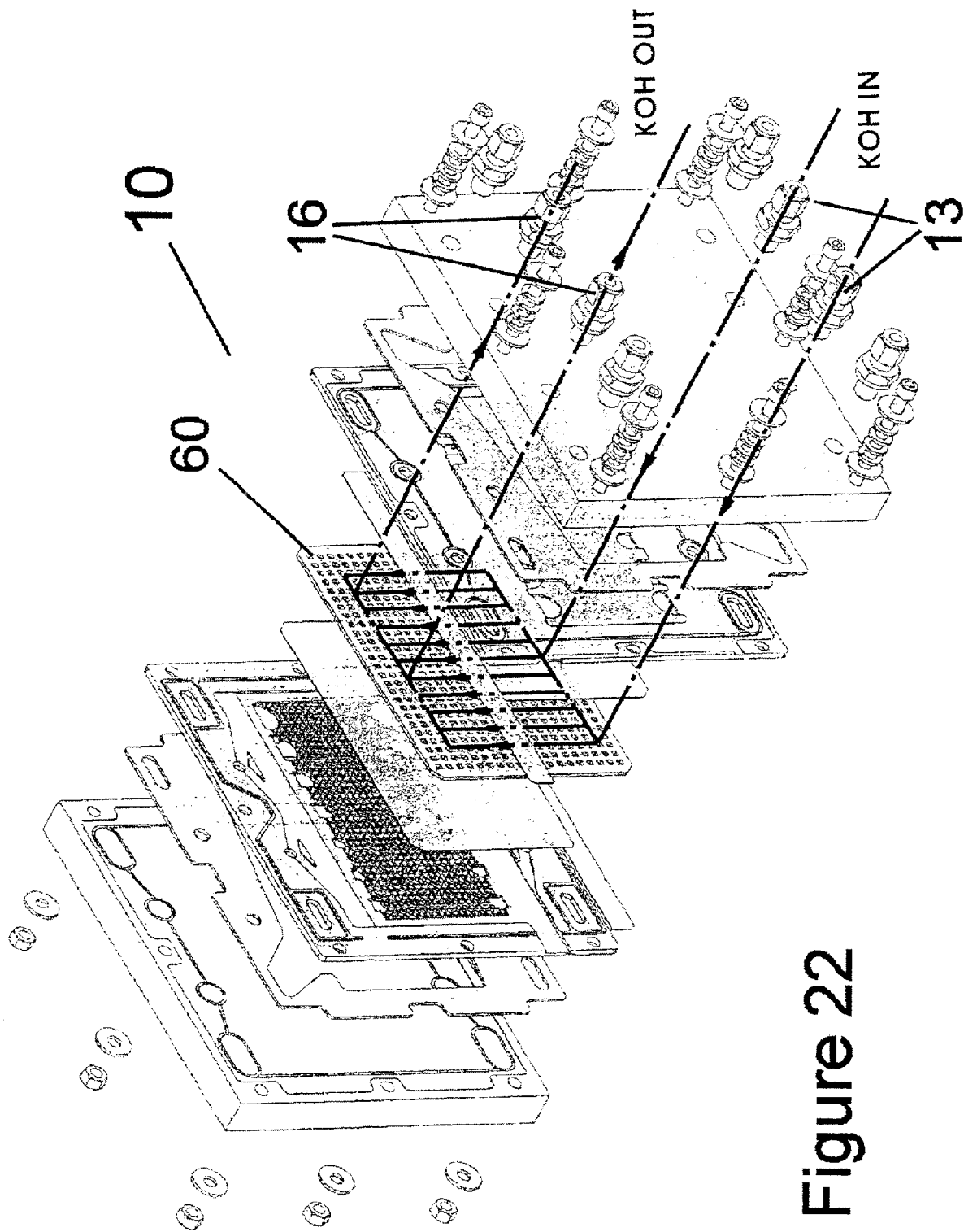
FIG. 22, is an exploded view of the fuel cell of the present invention, specifically shown is the flow of electrolyte solution through the fuel cell.

The flow of the electrolyte solution through the fuel cell is shown in FIG. 22. The electrolyte solution is an aqueous alkaline electrolyte in intimate contact with the electrolyte contacting surfaces of hydrogen electrodes and the oxygen electrodes. The alkaline solution is well known in the art and is typically a potassium hydroxide solution. The electrolyte solution is supplied to the porous electrolyte chambers through electrolyte solution inlets 13. The electrolyte solution is distributed through the electrolyte chamber 60 by flow distributing structures located in the oxygen and hydrogen electrode frame 30 and the oxygen electrode frame 50. The electrolyte solution flows through the electrolyte chamber 60 and contacts the electrolyte contacting surface of the hydrogen electrode 27 and the electrolyte contacting surface of the oxygen electrode 47. The electrolyte provides hydroxyl ions which react with hydrogen ions at the electrolyte contacting surface of the hydrogen electrode and water molecules which react with oxygen ions at the electrolyte contacting surface of the oxygen electrode. The electrolyte is circulated through the fuel cell via inlets 13 and outlets 16 (in alternative embodiments, the electrolyte may be deliberately immobilized as by jelling, etc.). The circulated electrolyte may be externally heated or cooled as necessary, and the concentration of the electrolyte can be adjusted as needed to compensate for the water produced by the cell and any losses due to evaporation of water through the electrodes. Systems for conditioning the fuel cell electrolyte are well known in the art and need not be further described in detail herein.

Figure 23:
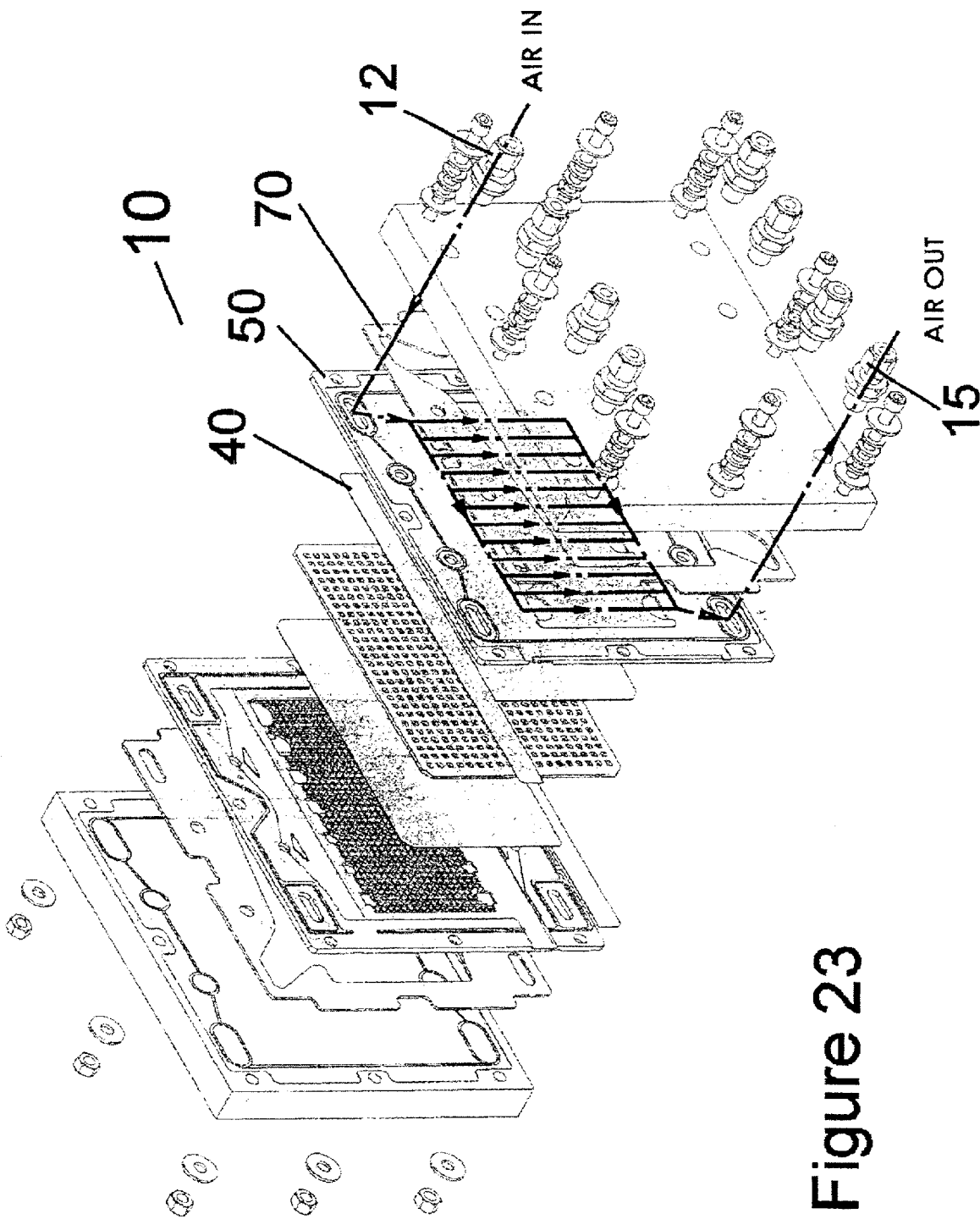
FIG. 23, is an exploded view of the fuel cell of the present invention, specifically shown is the flow of air through the fuel cell.
Figure 24:
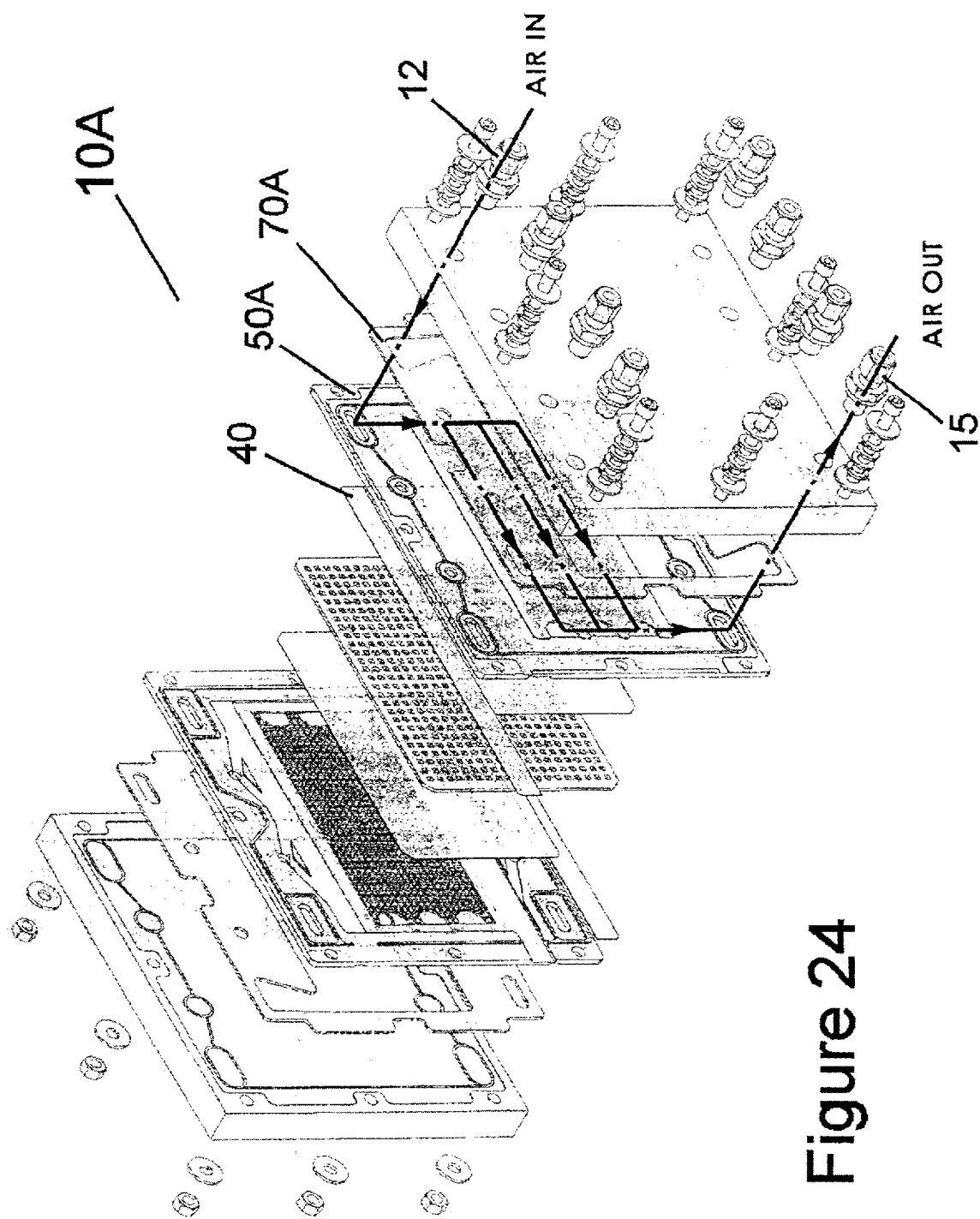
FIG. 24, is an exploded view of the alternative embodiment of the fuel cell of the present invention, specifically shown is the flow of air through the fuel cell.

The flow of oxygen through the fuel cell is shown in FIG. 23. Oxygen enters the fuel cell through the oxygen inlet and flows to the outer side of the oxygen electrode plate 50. The oxygen is then distributed through the oxygen electrode frame 50 and across the oxygen contacting side 46 of the oxygen electrode 40 by flow channels formed in the compression plate 70 in contact with the outer side of the oxygen electrode frame 50. Oxygen is then absorbed through the oxygen contacting surface 46 into the oxygen electrode 40. The absorbed oxygen is catalytically broken down by the cathode active material. The reactive oxygen is then electrochemically reduced at the electrolyte interface to form hydroxyl ions. Any unabsorbed oxygen and other gases in the feed (e.g. nitrogen, carbon dioxide, etc.) or water vapor in the oxygen supply are vented through the oxygen outlet 15. The flow of oxygen through the alternate embodiment of the fuel cell 10A is shown in FIG. 24.

The foregoing is provided for purposes of explaining and disclosing preferred embodiments of the present invention. Modifications and adaptations to the described embodiments, particularly involving changes to the shape of the fuel cell, the type of hydrogen storage alloy, the cathode active material, the shape and design of the electrodes within the fuel cell, and the shape and design of the electrode flow channels, will be apparent to those skilled in the art. These changes and others may be made without departing from the scope or spirit of the invention in the following claims.

What is claimed is:

1. A fuel cell comprising:
    at least one hydrogen electrode plate having an inner side and an outer side, wherein a hydrogen electrode is disposed within said inner side of said hydrogen electrode plate and a compression plate is disposed within said outer side of said hydrogen electrode plate;
    at least one oxygen electrode plate having an inner side and an outer side, wherein an oxygen electrode is disposed within said inner side of said oxygen electrode plate and a compression plate is disposed within said outer side of said oxygen electrode plate;
    at least one electrolyte chamber disposed between said hydrogen electrode and said oxygen electrode;
    said compression plate which is disposed within said hydrogen electrode plate is configured to direct a hydrogen stream which is in contact with said outer side of said hydrogen electrode plate through at least one hole in said hydrogen electrode plate to a series of hydrogen flow channels within said inner side of said hydrogen electrode plate, said hydrogen flow channels configured to distribute said hydrogen stream across said hydrogen electrode;
    said compression plate which is disposed within said oxygen electrode plate is configured to direct an oxygen containing stream which is in contact with said outer side of said oxygen electrode plate through at least one hole in said oxygen electrode plate to a series of oxygen flow channels within said inner side of said oxygen electrode plate, said oxygen flow channels configured to distribute said oxygen containing stream across said oxygen electrode;
    said inner sides of said hydrogen electrode plate and said oxygen electrode plate being adhered together forming a series of electrolyte flow channels disposed between said hydrogen electrode plate and said oxygen electrode plate, and a plurality of electrolyte flow distributing structures disposed within said electrolyte flow channels, said series of electrolyte flow channels and said electrolyte flow distributing structures being configured to uniformly distribute an electrolyte solution laterally through said electrolyte chamber.

2. The fuel cell according to claim 1, wherein said hydrogen electrode plate and said oxygen electrode plate have a tongue and groove configuration.

3. The fuel cell according to claim 1, wherein said flow distributing structures extend from said hydrogen electrode plate to said oxygen electrode plate.

4. The fuel cell according to claim 1, wherein said flow distributing structures provide support to said fuel cell.

5. The fuel cell according to claim 1, wherein said flow distributing structures have a polygonal cross section.

6. The fuel cell according to claim 1, wherein said flow distributing structures have a circular cross section.

7. The fuel cell according to claim 1, wherein said electrolyte chamber provides mechanical support within said fuel cell and provides a pathway for said electrolyte solution to contact said hydrogen electrode and said oxygen electrode.

8. The fuel cell according to claim 1, wherein said electrolyte chamber contacts an electrolyte contacting surface of said hydrogen electrode and said oxygen electrode.

9. The fuel cell according to claim 1, wherein said electrolyte chamber further comprises a porous support structure disposed between a pair of membranes.

10. The fuel cell according to claim 9, wherein said pair of membranes prevent excess electrolyte solution from contacting said hydrogen electrode and said oxygen electrode.

11. The fuel cell according to claim 9, wherein said pair of membranes prevent said oxygen containing stream and said hydrogen stream from penetrating into said electrolyte.

12. The fuel cell according to claim 9, wherein said porous support structure is comprised of an expanded polymer sheet.

13. The fuel cell according to claim 12, wherein said expanded polymer sheet is comprised of a polyolefin.

14. The fuel cell according to claim 1, wherein said compression plates are adapted to absorb expansion of said hydrogen electrode.

15. The fuel cell according to claim 1, wherein said compression plates provide mechanical support within said fuel cell.

16. The fuel cell according to claim 1, wherein said compression plates are comprised of rubber.

17. The fuel cell according to claim 1, wherein said hydrogen electrode comprises an anode active material having hydrogen storage capacity.

18. The fuel cell according to claim 17, wherein said hydrogen electrode has a hydrogen contacting surface, an electrolyte solution contacting surface, and a bulk of said active anode material.

19. The fuel cell according to claim 18, wherein said bulk of said anode active material is disposed between said hydrogen contacting surface and said electrolyte contacting surface.

20. The fuel cell according to claim 18, wherein said hydrogen contacting surface is adapted to dissociate and absorb gaseous hydrogen.

21. The fuel cell according to claim 20, wherein said bulk of said anode active material is adapted to store said absorbed hydrogen.

22. The fuel cell according to claim 21, wherein said electrolyte solution contacting surface is adapted to react said stored hydrogen with an electrolyte solution.

23. The fuel cell according to claim 1, wherein said hydrogen electrode comprises an anode active material layer, a porous polytetrafluoroethylene layer, and a current collector grid.

24. The fuel cell according to claim 23, wherein said anode active material layer is disposed between said current collector grid and said polytetrafluoroethylene layer.

25. The fuel cell according to claim 23, wherein said anode active material layer is dispersed throughout said current collector grid.

26. The fuel cell according to claim 23, wherein said anode active material layer comprises a mixture of mischmetal nickel alloy, raney nickel, graphite, and polytetrafluoroethylene powder.

27. The fuel cell according to claim 26, wherein said anode active material layer has the following composition:
    35 weight percent mischmetal nickel alloy,
    46 weight percent raney nickel,
    4 weight percent graphite, and
    15 weight percent polytetrafluoroethylene powder.

28. The fuel cell according to claim 23, wherein said current collector grid comprises at least one selected from the group consisting of mesh, grid, matte, expanded metal, foil, foam and plate.

29. The fuel cell according to claim 23, wherein said current collector grid comprises 40 wires per inch running horizontally and 20 wires per inch running vertically.

30. The fuel cell according to claim 23, wherein said current collector grid is comprised of a conductive metal.

31. The fuel cell according to claim 30, wherein said conductive metal is nickel.

32. The fuel cell according to claim 1, wherein said oxygen electrode comprises a cathode active material.

33. The fuel cell according to claim 32, wherein oxygen electrode has an oxygen contacting surface, an electrolyte solution contacting surface, and a bulk of said cathode active material.

34. The fuel cell according to claim 33, herein said bulk of said cathode active material is disposed between said oxygen contacting surface and said electrolyte solution contacting surface.

35. The fuel cell according to claim 33, wherein said oxygen contacting surface is adapted to dissociate and absorb gaseous oxygen.

36. The fuel cell according to claim 35, wherein said bulk of said cathode active material is adapted to store said absorbed oxygen.

37. The fuel cell according to claim 36, wherein said electrolyte solution contacting surface is adapted to react said stored oxygen with an electrolyte solution.

38. The fuel cell according to claim 1, wherein said oxygen electrode comprises a gas diffusion layer, a catalyst layer, a polytetrafluoroethylene layer, and a current collector grid.

39. The fuel cell according to claim 38, wherein said catalyst layer is disposed between said gas diffusion layer and said current collector grid.

40. The fuel cell according to claim 38, wherein said gas diffusion layer is disposed between said catalyst layer and said polytetrafluoroethylene layer.

41. The fuel cell according to claim 38, wherein said polytetrafluoroethylene layer is in intimate contact with said oxygen containing stream.

42. The fuel cell according to claim 38, wherein said catalyst layer is dispersed throughout said current collector grid.

43. The fuel cell according to claim 38, wherein said current collector grid is in intimate contact with said electrolyte stream.

44. The fuel cell according to claim 38 wherein said current collector comprises at least one selected from the group consisting of mesh, grid, matte, expanded metal, foil, foam and plate.

45. The fuel cell according to claim 38, wherein said current collector grid comprises 40 wires per inch running horizontally and 20 wires per inch running vertically.

46. The fuel cell according to claim 38, wherein said current collector grid is comprised of a conductive metal.

47. The fuel cell according to claim 38, wherein said current collector grid is comprised of nickel.

48. The fuel cell according to claim 38, wherein diffusion layer has the following composition:
    40 weight percent polytetrafluoroethylene;
    60 weight percent carbon black.

49. The fuel cell according to claim 38, wherein said catalyst layer has the following composition:
    50 weight percent of a mixture by weight of 40 percent polytetrafluoroethylene and 60 percent carbon black,
    15 weight percent carbon black;
    15 weight percent graphite;
    20 weight percent silver oxide.

50. The fuel cell according to claim 49, said silver oxide includes a lithium aluminum alloy.

51. The fuel cell according to claim 49, aid silver oxide includes gallium.

52. The fuel cell according to claim 1, wherein said electrolyte solution is comprised of a potassium hydroxide solution.

53. The fuel cell according to claim 1, wherein said oxygen containing stream comprises air.

54. The fuel cell according to claim 1, wherein said hydrogen stream comprises gaseous hydrogen.

* * * * *